March 5, 1935. J. P. BROPHY Re. 19,485

AUTOMATIC MACHINE

Original Filed May 12, 1923 25 Sheets-Sheet 1

INVENTOR.
John P. Brophy
BY Fay, Oberlin & Fay
ATTORNEYS.

March 5, 1935. J. P. BROPHY Re. 19,485

AUTOMATIC MACHINE

Original Filed May 12, 1923 25 Sheets-Sheet 2

INVENTOR.
John P. Brophy
BY
Fay, Oberlin & Fay
ATTORNEYS.

March 5, 1935. J. P. BROPHY Re. 19,485

AUTOMATIC MACHINE

Original Filed May 12, 1923 25 Sheets-Sheet 3

INVENTOR.
John P. Brophy
BY
Fay, Oberlin & Fay
ATTORNEYS

March 5, 1935. J. P. BROPHY Re. 19,485

AUTOMATIC MACHINE

Original Filed May 12, 1923 25 Sheets-Sheet 4

INVENTOR.
John P. Brophy
BY
Fay, Oberlin & Fay
ATTORNEYS

March 5, 1935. J. P. BROPHY Re. 19,485

AUTOMATIC MACHINE

Original Filed May 12, 1923 25 Sheets-Sheet 5

INVENTOR.
John P. Brophy
BY Fay, Oberlin & Fay
ATTORNEYS.

March 5, 1935. J. P. BROPHY Re. 19,485

AUTOMATIC MACHINE

Original Filed May 12, 1923 25 Sheets-Sheet 6

INVENTOR.
John P. Brophy
BY Fray, Oberlin & Fray
ATTORNEYS.

March 5, 1935. J. P. BROPHY Re. 19,485

AUTOMATIC MACHINE

Original Filed May 12, 1923 25 Sheets-Sheet 7

INVENTOR.
John P. Brophy
BY Fray, Oberlin & Fray
ATTORNEYS

March 5, 1935. J. P. BROPHY Re. 19,485

AUTOMATIC MACHINE

Original Filed May 12, 1923 25 Sheets-Sheet 8

INVENTOR.
John P. Brophy
BY Fay, Oberlin & Fay
ATTORNEYS.

March 5, 1935. J. P. BROPHY Re. 19,485

AUTOMATIC MACHINE

Original Filed May 12, 1923 25 Sheets-Sheet 9

INVENTOR.
John P. Brophy
BY Fay, Oberlin & Fay
ATTORNEYS

INVENTOR.
John P. Brophy
BY Fay, Oberlin & Fay
ATTORNEYS.

March 5, 1935. J. P. BROPHY Re. 19,485

AUTOMATIC MACHINE

Original Filed May 12, 1923 25 Sheets-Sheet 11

INVENTOR.
John P. Brophy
BY Fray, Oberlin & Fray
ATTORNEYS.

March 5, 1935. J. P. BROPHY Re. 19,485

AUTOMATIC MACHINE

Original Filed May 12, 1923 25 Sheets-Sheet 12

INVENTOR.
John P. Brophy
BY Fay, Oberlin & Fay
ATTORNEYS.

March 5, 1935. J. P. BROPHY Re. 19,485

AUTOMATIC MACHINE

Original Filed May 12, 1923 25 Sheets-Sheet 13

INVENTOR.
John P. Brophy
BY Fray, Oberlin & Fray
ATTORNEYS.

INVENTOR.
John P. Brophy
BY Fay, Oberlin & Fay
ATTORNEYS.

March 5, 1935. J. P. BROPHY Re. 19,485

AUTOMATIC MACHINE

Original Filed May 12, 1923 25 Sheets-Sheet 15

INVENTOR.
John P. Brophy

BY Fay, Oberlin & Fay
ATTORNEYS

AUTOMATIC MACHINE

Original Filed May 12, 1923 25 Sheets-Sheet 16

INVENTOR.
John P. Brophy
BY Fay, Oberlin & Fay
ATTORNEY

March 5, 1935. J. P. BROPHY Re. 19,485

AUTOMATIC MACHINE

Original Filed May 12, 1923 25 Sheets-Sheet 17

INVENTOR.
John P. Brophy
BY
Fray, Oberlin & Fray
ATTORNEYS.

March 5, 1935. J. P. BROPHY Re. 19,485

AUTOMATIC MACHINE

Original Filed May 12, 1923 25 Sheets-Sheet 18

INVENTOR.
John P. Brophy
BY Fay, Oberlin & Fay
ATTORNEYS

March 5, 1935. J. P. BROPHY Re. 19,485

AUTOMATIC MACHINE

Original Filed May 12, 1923 25 Sheets-Sheet 19

INVENTOR.
John P. Brophy
BY Fay, Oberlin & Fay
ATTORNEYS.

March 5, 1935. J. P. BROPHY Re. 19,485

AUTOMATIC MACHINE

Original Filed May 12, 1923 25 Sheets-Sheet 20

INVENTOR.
John P. Brophy
BY Fay, Oberlin & Fay
ATTORNEYS.

March 5, 1935. J. P. BROPHY Re. 19,485

AUTOMATIC MACHINE

Original Filed May 12, 1923 25 Sheets-Sheet 21

INVENTOR.
John P. Brophy
BY Fay, Oberlin & Fay
ATTORNEYS.

March 5, 1935. J. P. BROPHY Re. 19,485

AUTOMATIC MACHINE

Original Filed May 12, 1923 25 Sheets-Sheet 22

INVENTOR.
John P. Brophy
BY Fay, Oberlin & Fay
ATTORNEYS.

March 5, 1935. J. P. BROPHY Re. 19,485

AUTOMATIC MACHINE

Original Filed May 12, 1923 25 Sheets-Sheet 23

INVENTOR.
John P. Brophy
BY Fray, Oberlin & Fray
ATTORNEYS.

INVENTOR.
John P. Brophy
BY Fay, Oberlin & Fay
ATTORNEYS.

INVENTOR.
John P. Brophy
BY Fay, Oberlin & Fay
ATTORNEYS.

Reissued Mar. 5, 1935 Re. 19,485

UNITED STATES PATENT OFFICE 19,485

AUTOMATIC MACHINE

John P. Brophy, Cleveland, Ohio, assignor to The Cleveland Automatic Machine Company, Cleveland, Ohio, a corporation of Ohio Original No. 1,779,529, dated October 28, 1930, Serial No. 638,512, May 12, 1923. Application for reissue October 10, 1932, Serial No. 637,195

52 Claims. (Cl. 29—37)

The present invention relates to automatic machines of the metal working class and refers more particularly to a new and improved multiple spindle automatic machine wherein a plurality of blanks are rotatably supported and a number of forming tools, carried in a reciprocating tool slide, are employed to engage the several blanks collectively during one complete movement of the tool slide.

My invention contemplates the provision of an automatic machine having a spindle turret revolubly supporting a plurality of work holding spindles and having a tool slide carrying a number of cutting tools adapted to cooperate with said spindles to efficiently and expeditiously produce finished articles from bars of stock fed through the spindles. The machine herein provided is simple in construction, automatic in every operation, and capable of producing a better quality of work in greater capacity than existing machines of the same general character. In securing this end, I have devised the present novel multiple spindle automatic machine in which are embodied certain important improvements capable of being utilized in machines other than the exact form disclosed herein.

One of the objects of this invention is to provide new and improved means for continuously driving the several work spindles from a driving shaft located externally of the spindle turret. Heretofore, in all machines of the present class the driving shaft has been located centrally of the spindle turret and the spindles driven from a gear or gears thereon. Due to the turning or indexing of the entire spindle turret, it is necessary to extend the drive shaft beyond the turret itself and in most instances this shaft extends across the space between the spindles and the cutting tools, which has been a very undesirable feature as it took up valuable space, making it necessary to enlarge the machine sufficiently so that the cutting tools will clear the driving shaft. This difficulty I have overcome by locating the driving shaft externally of the spindle turret and by providing suitable driving connection between said shaft and each of the spindles. Said means preferably consists of a flexible element such as a chain sprocketed to the drive shaft and passing through the turret housing to suitable sprockets provided on the spindles.

Another object of my invention is to provide means to insure the machine against jamming or breaking, due to the stock feeding element engaging the end of the stock when the piece has become short. I provide a spring actuated stock feeding element of sufficient strength to accomplish the feeding function but which is adapted to allow a certain amount of freedom in the feeding element should the stock piece become wedged in the spindle.

A further object of this invention is to provide novel means for indexing or turning the spindle turret, which means may consist of an interrupted gear of the "Geneva" type attached to the turret body and operated by a sector gear provided with sufficient teeth to index the spindles in the turret from just one station to another at a time. The sector is provided with adjustable stop lugs adapted to engage the interrupted portion of the Geneva gear and positively arrest the turning motion of the spindle turret at the desired time. It will be apparent that considerable wear or strain is caused by moving a heavy mass of iron, such as comprises the spindle turret and spindles, from a dead stop, and then again stopping its movement short.

This invention also comprehends the provision of means for giving the entire spindle turret body an initial impulse or "kick-off" in its advancing direction slightly ahead of the engagement of the indexing sector with the Geneva gear. By this construction I am able to slightly speed up production and eliminate to a great degree the shock and wear caused by suddenly moving the heavy turret from a stationary position. Cooperating means is also provided for positively holding the turret with its spindles correctly aligned during the forming operations.

Another object of this invention is to provide means for feeding and for gauging the stock during the time the spindle turret is indexing. This operation has heretofore been performed while the turret was stationary and required the use and time of a separate operation between the interval when the finished article was severed from the bar stock and a fresh blank presented for its first operation. In the present machine, this extra step is done away with, which results in considerable saving of time and expedites production.

A further object hereof resides in the provision of a tool holder having an accelerated motion, i. e., a tool holder which is actuated at a greater speed than the other tool holders. Consequently, the accelerated tool may be timed to perform its function at one stage upon the blank and then be withdrawn so that a second tool may be employed for use on the blank at the same stage during the forward motion of the tool slide. This feature is also quite important and results in the saving of considerable time and eliminates the necessity of an extra spindle.

A still further object of this invention is to provide simple self-contained means whereby the speed of the spindles and the feed speed of the tool turret may be quickly and easily effected without the removal or substitution of a single element. In fact, the entire machine resultant from my invention is self-contained and such changes as may be made within its scope of operation are rendered possible without the use of supplemental parts, as is done in all previous machines when changing from one set-up to another. Said speed regulating means may consist of one or more differential gear boxes controlled from hand levers provided in connection with tabulated dials. Thus various changes may be made by the use of a reference table and merely setting the hand levers at their proper places on the dials. This construction takes the place of the ordinary nest of change gears which are often laborious to change and require considerable calculation. Further, I provide suitable driving connection between the spindle drive and the tool turret feed so that after one setting of the tool feed per revolution of the spindles, the speed of the spindles may be varied without changing the relative feeding speed of the forming tools.

The above and other objects will more fully appear from the following description and accompanying drawings and will be especially pointed out in the appended claims.

Figure 1:
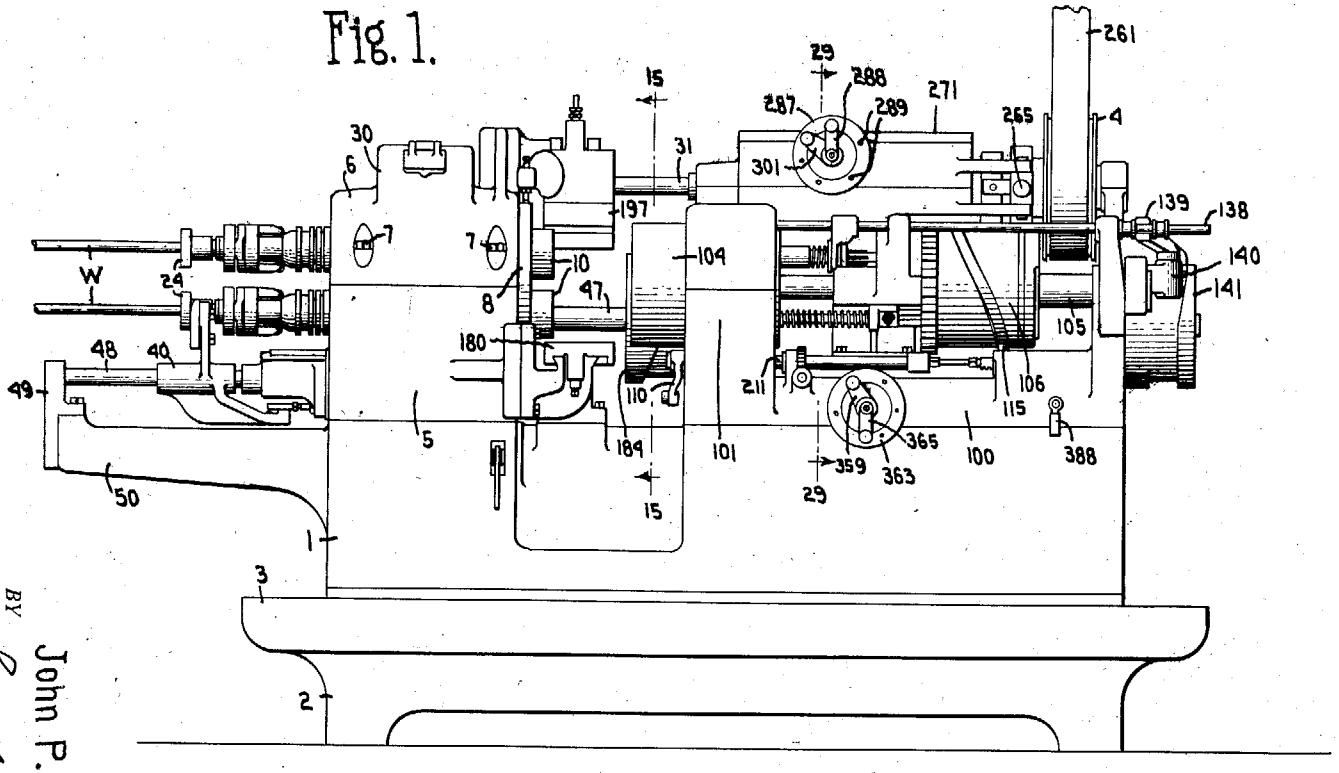
Fig. 1 is a front elevation of a preferred form of multiple spindle automatic machine embodying my invention.

I have illustrated in the accompanying drawings a preferred embodiment of this invention, which comprises a bed plate 1 mounted upon suitable standards or legs 2 and having the flange pan 3 surrounding the base which serves in the usual manner to catch the oil used for lubricating and cooling the cutting tools. The pan also serves to catch the finished product when ejected or dropped from the cutting tools, as will be presently described. Mounted on top of the bed plate are suitable supports or housings and mechanisms for holding and for forming blanks from bar stock into articles of desired shape. The present machine is so designed to receive a plurality of bars of stock at one time which are gripped in suitable rotating spindle chucks carried in a revoluble spindle turret. Acting upon each of the bars held in the spindle is a set of cutting tools mounted in a reciprocating tool slide which cooperate in timed relation so as to perform their entire function upon the corresponding blanks during one complete reciprocation of the tool turret. Between each reciprocation of the tool slide the spindle turret is indexed forward one position and the several blanks are presented to the cutting tools for the next succeeding operation. One blank is being finished and cut off from the bar stock at one complete movement of the tool slide and a new blank is then supplied by suitable feeding mechanism in the place of the severed one during the indexing operation of the spindle turret, as will be hereinafter more specifically described. Means for actuating the moving parts of the machine consist of a driven pulley 4, belted to any suitable source of power and having the necessary connections with such moving parts, as described in detail hereinafter.

The operation of my novel multiple spindle automatic machine is continuous, all the parts being automatically controlled and moved in timed relation with each other. While the construction and operation of each of the several parts is quite simple, it is deemed advisable, due to the large number of elements in this machine, to describe each division or class of elements separately for the sake of clearness and understanding in the following manner:

*The spindle turret and driving mechanism therefor*

Mounted upon one end of the bed plate 1 is a hollow casting consisting of a lower half 5 and an upper half 6 suitably secured together by bolts 7. This casting is to be termed herein as the spindle turret housing and carries therein a revoluble spindle turret 8 whose axis is arranged longitudinally of the machine. Means for revolving or indexing the spindle turret will appear later in this description under "indexing mechanism".

The turret 8 is provided in the usual manner with a plurality of circularly arranged longitudinal apertures 9 in which are received the revolving spindles 10. Each of the spindles is of ordinary construction, comprising a rotatable sleeve 11 carrying at one end a chuck body 12 and at the other end certain elements for actuating the gripping jaws 13 of the chuck which are carried on the end of a tube 14 located within the sleeve 11. The jaws 13 are actuated intermittently to grip the stock during the forming operation and to release it when the stock feeding mechanism is operating. Tube 14 is of the type generally employed in machines of this character; hence it is sufficient to state that the tube is actuated by means of bent levers 15 suitably mounted on sleeve 11 at the rear end of the turret housing and adapted to be actuated by a sliding conical collar 16. The collar 16 is provided with an encircling groove 17 in which are engaged the ends 18 of a pivoted yoke member 19 operated periodically to open and close the chuck jaws. The members 19 are operated in the usual manner by a segmental cam plate 20 engaging projections 21 on said members. Located centrally of the tube 14 and stopping short of the chuck jaws is a second tube 22 constituting the stock feeding member. The inner end of said feeding tube is provided with a resilient jaw portion 23 sufficiently strong to feed the stock forward when the jaws 13 are released, but not strong enough to interfere with the gripping action of the jaws 13. On the outer end of tube 22 is mounted a disk 24 which is engaged by the stock feeding mechanism to be described later. Suitable tapered bearings 25 are employed on the ends of sleeve 11 within the spindle turret by which wear may be easily taken up.

Intermediate the ends of the spindle turret housing, preferably at the center for convenience of construction, the upper half 6 is provided with a laterally extending boss or projection 30, the interior of this boss and the adjacent interior of the housing being hollowed out to receive the spindle driving mechanism. Spaced parallel with the spindle turret but away therefrom is a longitudinal driven shaft 31, the means for driving such shaft to be taken up later. Shaft 31 enters the projection 30, being suitably journaled therein in bearings 32, and is provided with a sprocket 33 over which is passed a chain or link belt 34. The chain 34 is led inwardly to engage around sprockets 35 carried on the spindles, as best seen in Figs. 10 to 14, the spindle turret being cut away for the reception of sprockets 35. As the whole spindle turret is adapted to be rotated in its indexing operation, it will be apparent from an inspection of Figs. 10 and 11 that in such turning one of the spindle sprockets will become out of engagement with chain 34, and it is necessary to provide means for tying or binding together the several spindle sprockets to maintain their positive rotation and respective lead at all times. Such means herein comprises the use of a second chain 36 which surrounds the spindle sprockets only and remains taut at all times. It is also necessary to compensate for the slack in chain 34 during the indexing operation, which may be satisfactorily accomplished by a weighted idler 37 radially movable with respect to shaft 31 on arms 38. Casing 6 may be provided with a removable cover section 39 to facilitate the assembly of the spindle drive chain.

The advantages of the present spindle drive will be manifest to one familiar with this particular class of machines. I eliminate the use of the usual center driving shaft and make it possible to drive the spindles from a shaft located exteriorly of the spindle turret.

*The stock feed mechanism*

Operating upon the disks 24 of the stock feeding tubes are means for advancing and means for retracting the tubes longitudinally of the spindles. The retracting means is of much the same general construction as those now in use on automatic metal working machines, which comprises a reciprocable sliding member 40 having a segmental shoe 41 adapted to engage in front of one disk at a time and move it rearwardly. The sliding member 40 is herein shown in the form of a sleeve provided with an upstanding lug 42, to which is secured the shoe 41 and with a depending boss 43 to which is attached the forward end of an operating lever 44 pivotally mounted on a projection of the bed plate. Means for actuating the member 40 through the lever 44 consists of a revolving cam 45 engaging a cam roller 46 on the rear end of said lever. Cam 45 is mounted on the main cam shaft 47 of the machine, which will be described more fully hereinafter. The member 40 is slidably mounted on a bar or rod 48 supported longitudinally of the machine by a bracket 49 attached to the outer end of an arm 50 provided on the spindle end of the bed plate. An adjustable screw 51 may be utilized to limit the forward movement of member 40.

A second sliding member 52, slidably mounted on a rod 53 which is located parallel with rod 48 in the bracket 49, is provided for operating the feed of the stock. Member 52 is also provided with an upstanding lug 54 carrying a segmental shoe 55 adapted to engage in back of the disks 24 when in feeding position, at which time the cam 45 and lever 44 are inoperative. It will obviously be clear that forward movement of the shoe 55 will cause the tube 22 to advance the stock in the spindle.

Figure 2:
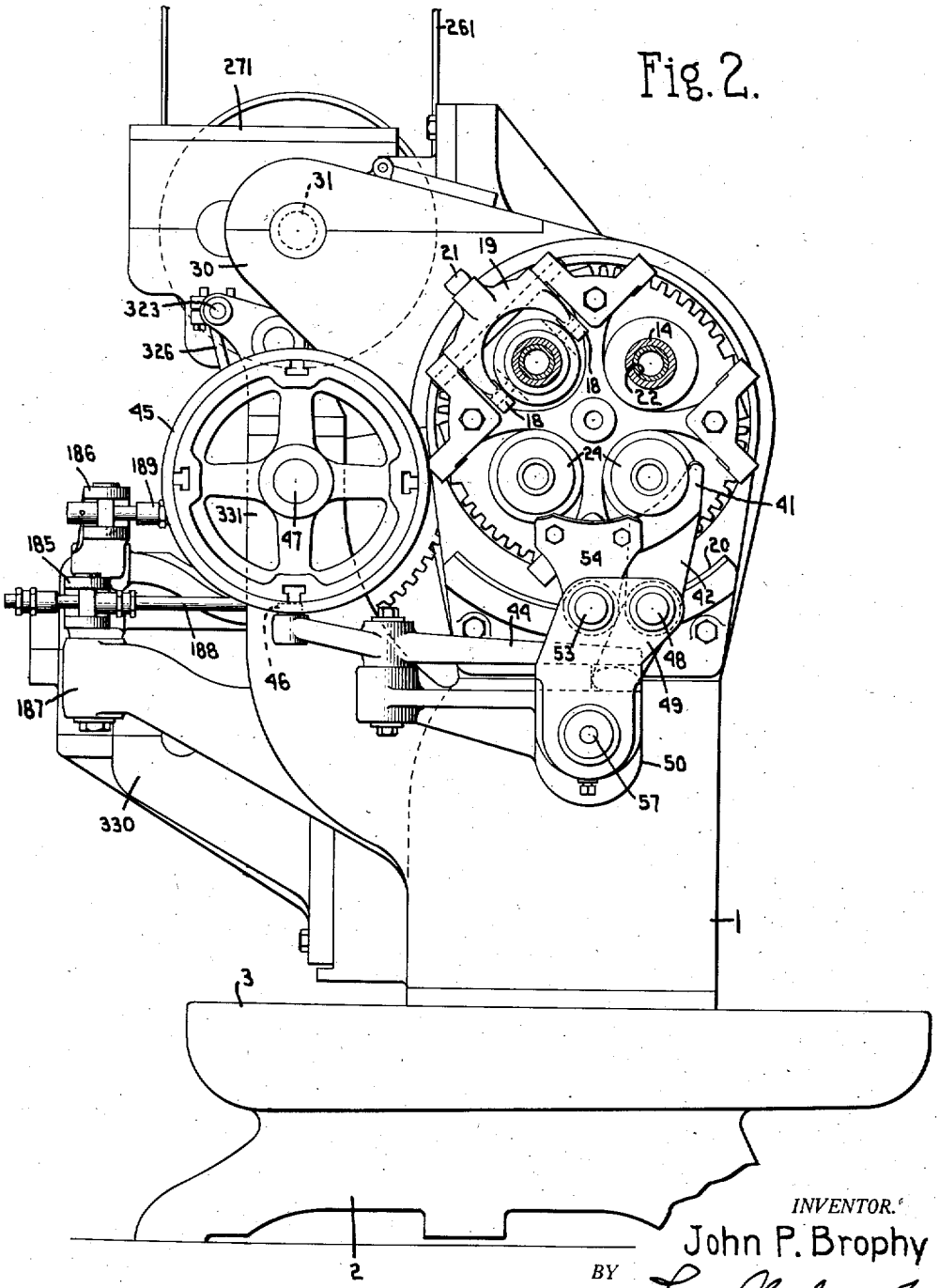
Fig. 2 is a lefthand elevation thereof on an enlarged scale.
Figure 3:
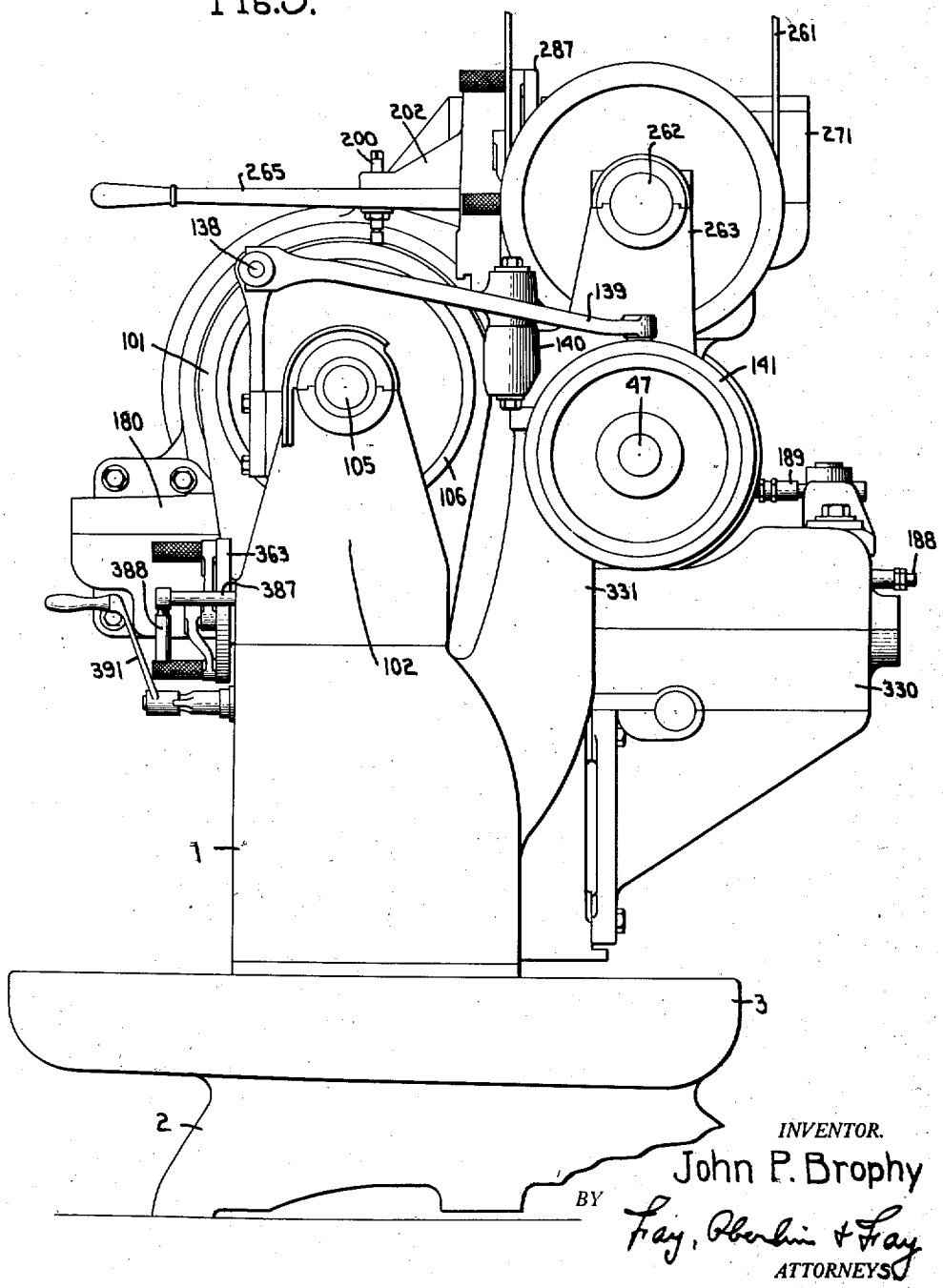
Fig. 3 is a righthand elevation thereof on an enlarged scale.
Figure 4:
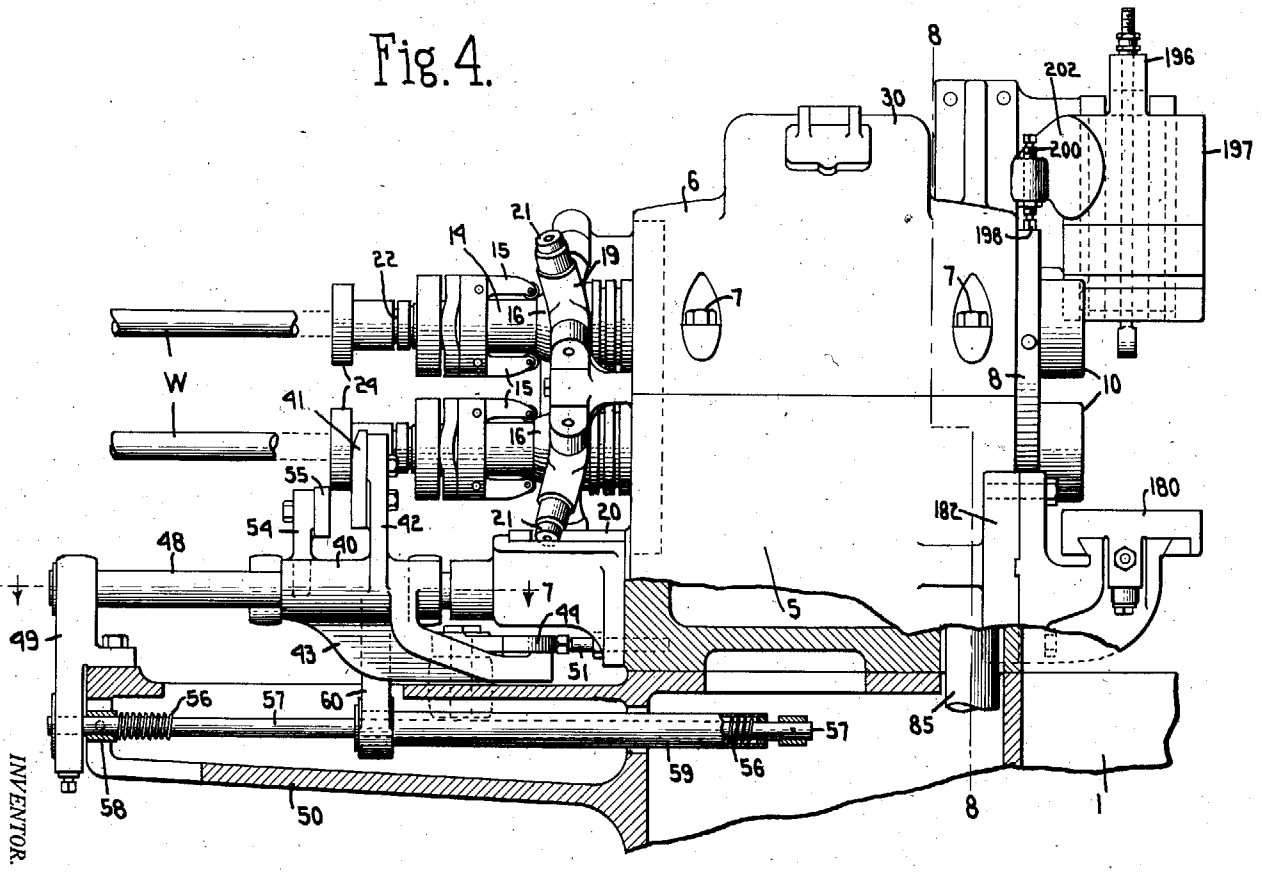
Fig. 4 is an enlarged front elevation of the lefthand or spindle end of my machine partly in section to illustrate certain features of the stock feed.
Figure 5:
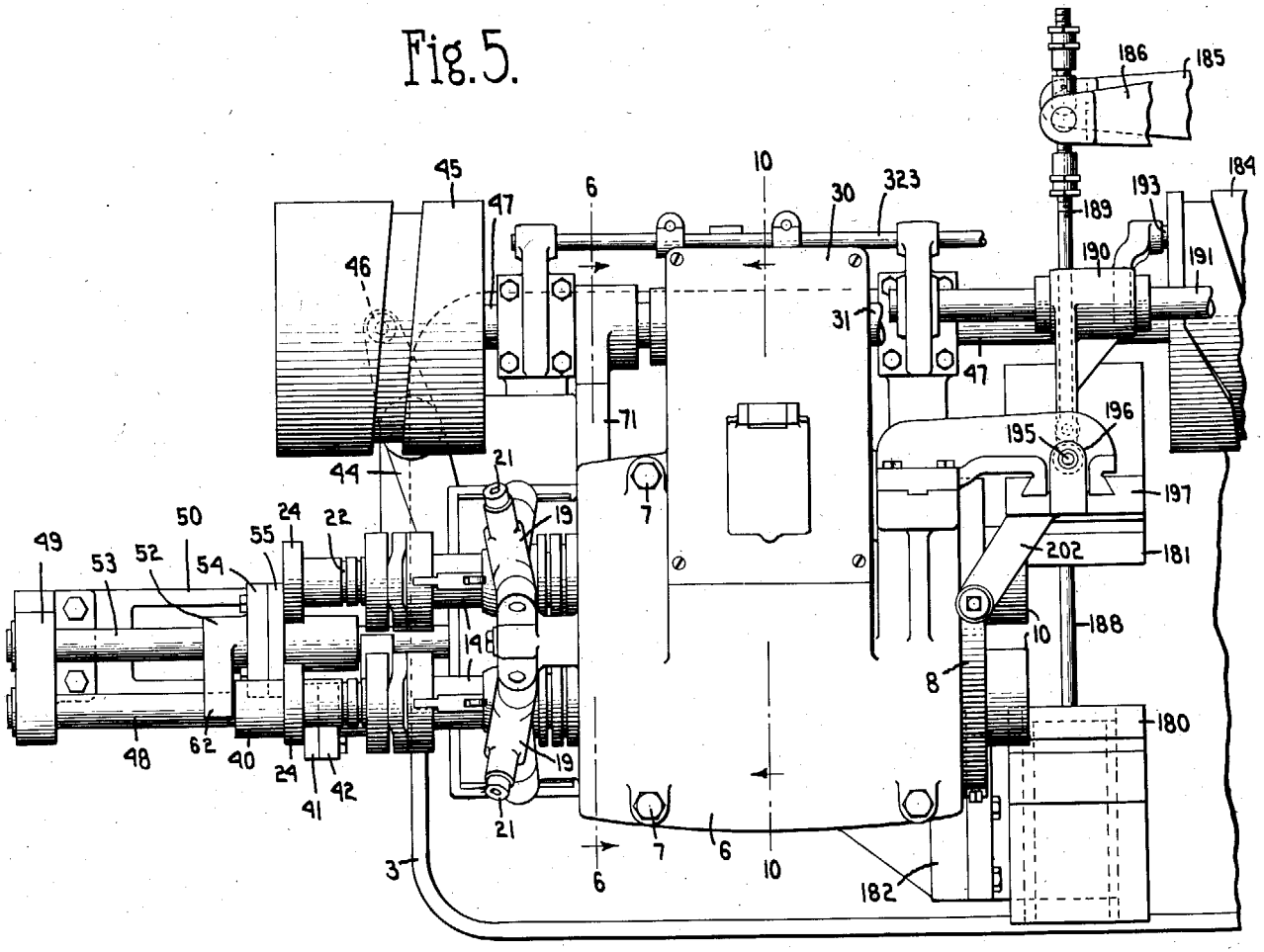
Fig. 5 is a plan view of the parts seen in Fig. 4.
Figure 6:
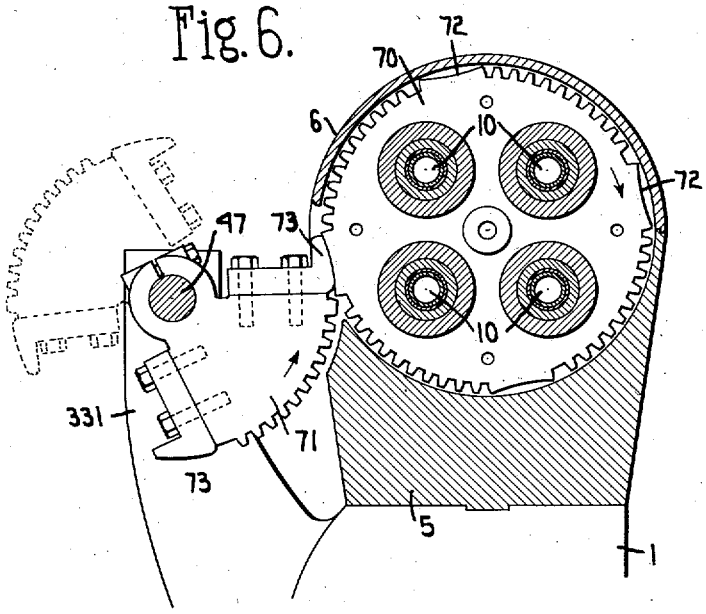
Fig. 6 is a sectional view on the line 6—6 in Fig. 5, showing in detail the spindle turret indexing mechanism.
Figure 7:
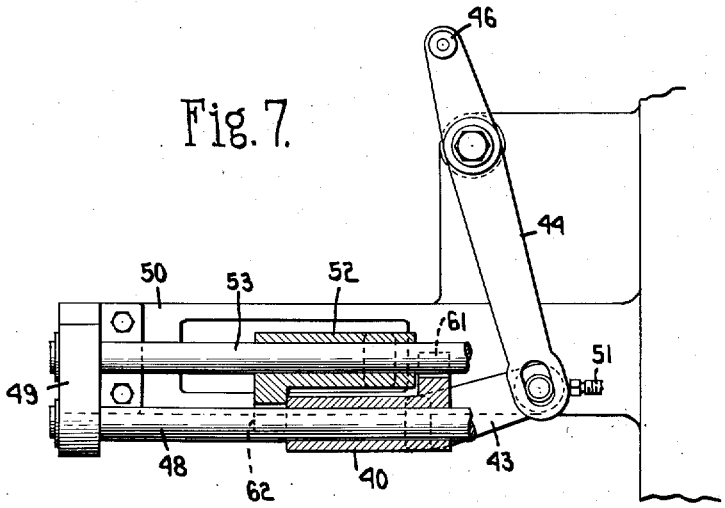
Fig. 7 is a detailed sectional view, taken on the line 7—7 of Fig. 4, of the stock feed mechanism.

As previously stated, I provide a means for feeding the stock which will have a certain amount of freedom in movement should the feeding tube become jammed at any time, or when such tube engages the end of a piece of stock. This means comprises a long compression spring 56 coiled about a fixed rod 57 located parallel and beneath the rod 53. The spring 56 is compressed between an adjustable collar 58 and the closed end of a tube 59 slidably received on the rod 57. Engaging around the tube 59 is a boss 60 depending from the sliding member 52, the natural tendency of the spring being to move the tube 59 and member 52 forwardly. As best seen in Fig. 7, the members 40 and 52 are provided with lateral bifurcated portions 61 and 62 respectively, which are extended toward each other and overlie the adjacent end of said members, the purpose thereof being to retract the shoe 55 and its sliding member against the action of the spring 56 simultaneously with the rearward movement of shoe 41 against the disk 24. Referring to Fig. 2, it will be seen that shoe 41 is segmental in form and that when the disk is moved beyond the edge thereof, the other shoe 55 will subsequently engage said disk and move it forwardly to feed the stock, at which time the projection 62 engages the sliding member 40 to replace said sleeve with its shoe 41 in a position ready for action on the next disk 24. It will also be seen that this construction allows the member 40 to be moved forwardly independently of the member 52, should such last named member stop short of its extreme forward movement.

*The spindle turret indexing and starting mechanism*

In the present machine several bars of stock are held in rotatable spindles and presented collectively to a set of forming tools. Tools in this selected embodiment of the invention are held in a reciprocating tool turret and the stock receiving spindles are held in a spindle turret as previously described, which is adapted to be rotated or indexed a certain number of degrees between each reciprocation of the tool turret so as to present the blanks for the next succeeding operation by said forming tools. The means herein provided for effecting such indexing comprises a gear 70 attached to or formed on the rear end of the spindle turret 8. Cooperating with this gear is a revolving sector gear 71 carried on the cam shaft 47 and provided with only enough teeth to turn gear 70 the desired number of degrees. The balance of the movement of said sector provides sufficient time for the forming tools to function. Gear 70 may be of the well known Geneva type provided with interrupted portions 72 cooperating with complementary lugs 73 on the sector 71 to arrest the movement of the spindle turret and hold it until the turret locking means is actuated, which will be described presently. To compensate for the wear which occurs in the indexing mechanism, lugs 73 are adjustably mounted on sector 71, which construction permits the necessary adjustment thereof to insure at all times a positive engagement of the lugs with the portions 72. In machines of this character, it is absolutely necessary that the spindle turret be stopped at the exact position so that the spindles will be correctly aligned with the forming tools.

Figure 8:
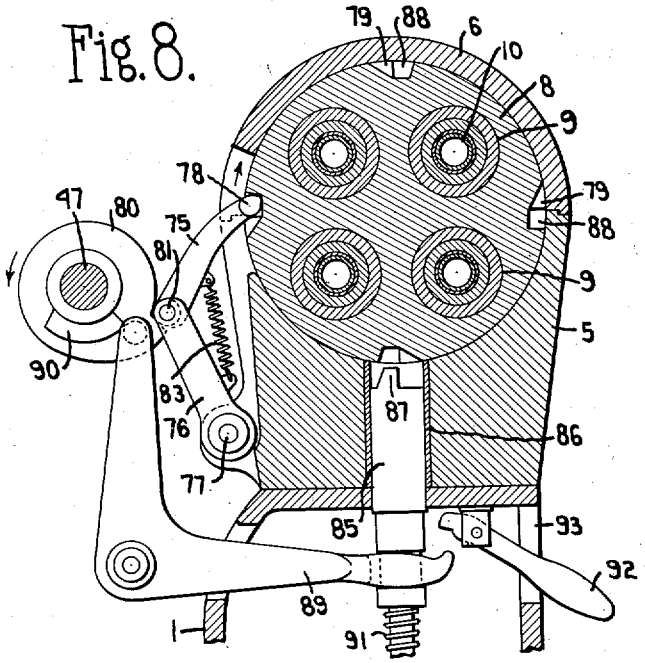
Fig. 8 is a sectional view through the spindle turret illustrating means for starting the rotation of the turret, as taken on line 8—8 of Fig. 4.
Figure 9:
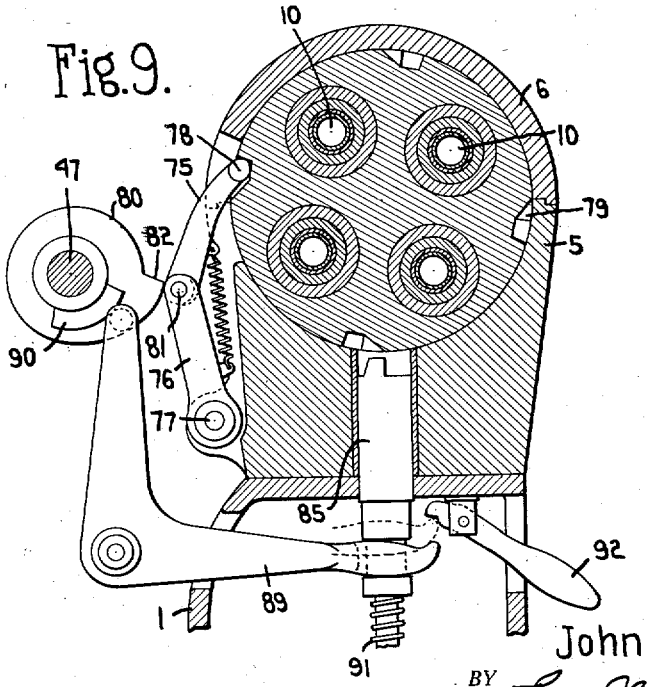
Fig. 9 is a similar view but showing the starting mechanism in a different operative position.
Figure 10:
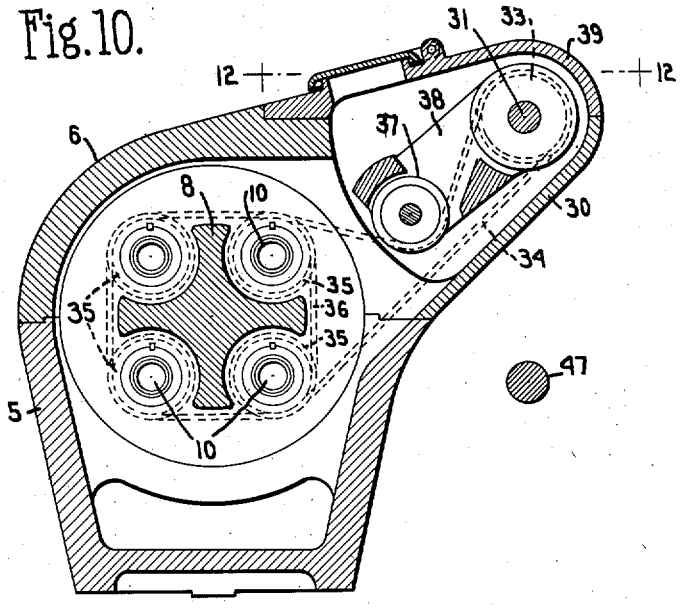
Fig. 10 is a sectional view taken through the spindle drive and spindle turret on line 10—10 of Fig. 5.
Figure 11:
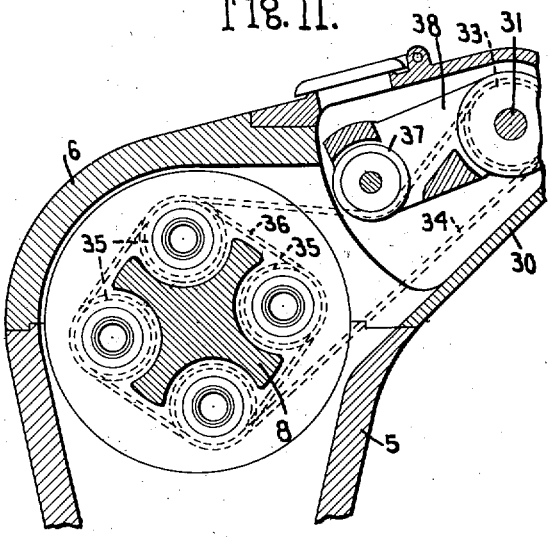
Fig. 11 is a similar view but showing the spindle turret indexing from one position to another.
Figure 12:
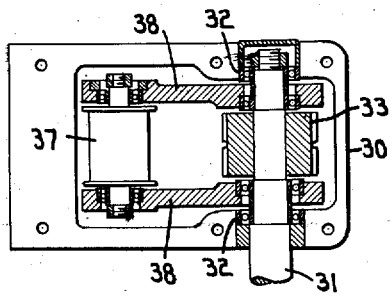
Fig. 12 is a detailed plan view taken on the line 12—12 in Fig. 10, with the cover plate removed.
Figure 13:
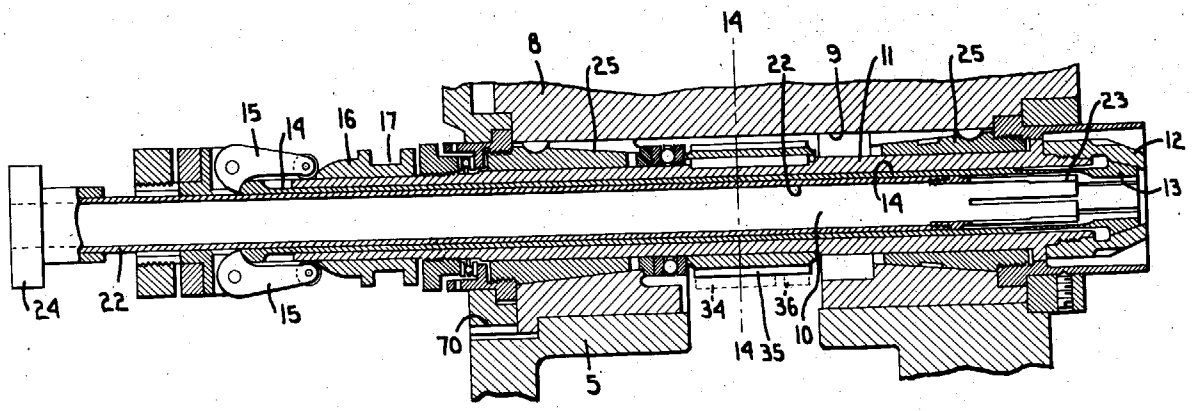
Fig. 13 is an enlarged longitudinal sectional view through one of the spindles and a portion of the spindle turret.
Figure 14:
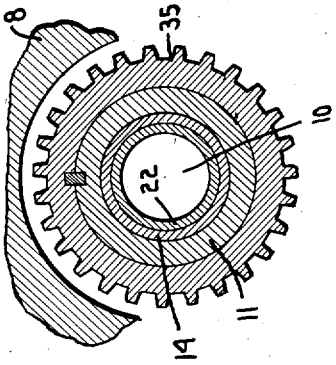
Fig. 14 is an enlarged sectional view on the line 14—14 in Fig. 13.
Figure 15:
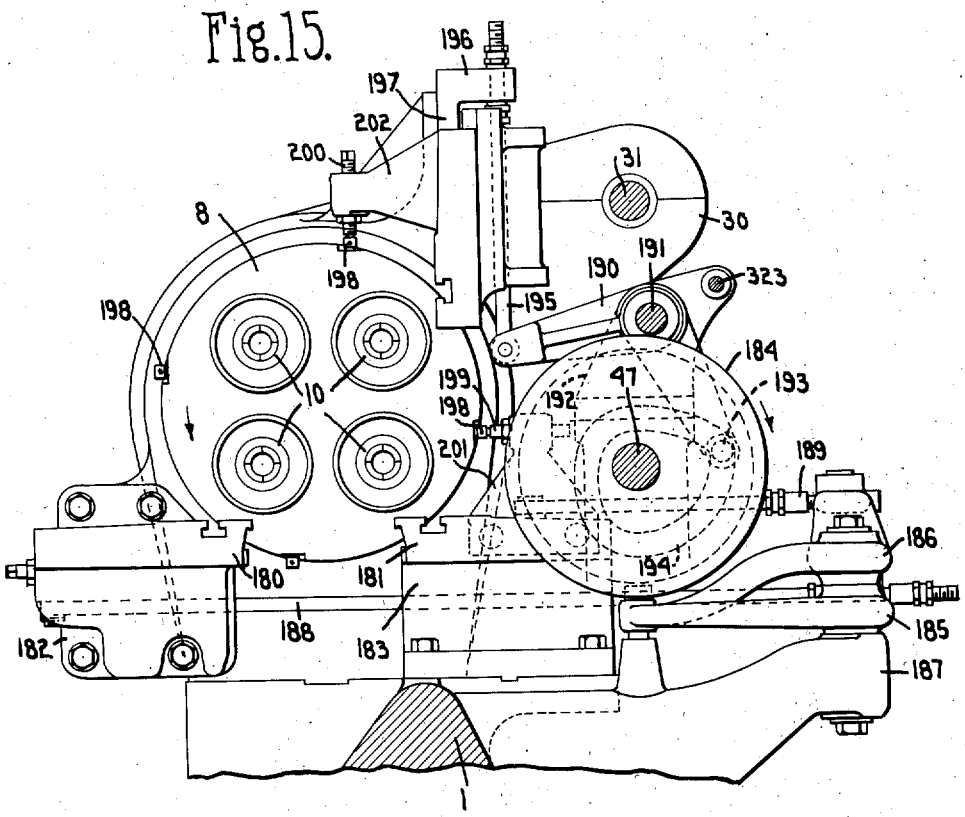
Fig. 15 is an enlarged sectional view on the line 15—15 in Fig. 1, looking in the direction of the arrows, showing in elevation the chucking ends of the spindles, the cross slides and the operating mechanism therefor.
Figure 42:
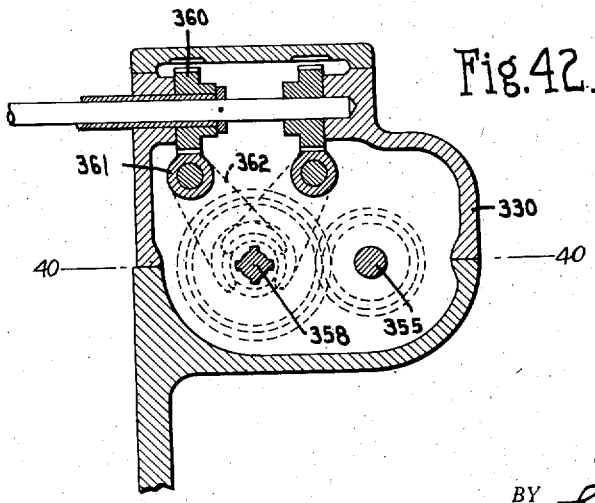
Fig. 42 is a sectional view on line 42—42 in Fig. 37.

Still further, this invention contemplates the provision of means whereby the spindle turret may be aided in its movement simultaneously with or just previous to the engagement of sector 71 with the gear 70. It will be apparent that the present machine and all others of this type are massive structures and that the spindle turret and mechanism carried thereby are quite heavy. To suddenly move such structure from a dead stop without the waste of time and to also arrest the movement of such structure abruptly requires the use of heavy mechanism and results in considerable wear thereof. In order to overcome this wear to a great degree and to speed up the indexing operation of the spindle turret, I have devised the present novel means for giving the turret body an initial impulse or kick-off just previous to the engagement of the sector gear. Such means may consist of a toggle lever connection 75 having one end 76 pivotally secured to the spindle turret housing at 77 and having the other end 78 thereof provided with a nose portion adapted to engage in suitable indentations 79 circumferentially provided in the spindle turret body 8. A cam 80 mounted on the cam shaft 47 engages the fulcrum pin 81 of the toggle connection to cause the closing thereof, which action will, as seen from Figs. 8 and 9, impart rotation to the turret body. The cam 80 has a sharply inclined portion 82 which is intended to engage the pin 81 and effect the sudden closing of the toggle, which action results in the quick movement or start of the spindle turret body. It will be understood that the cam 80 and toggle connection 75 are operated in timed conjunction with the sector 71 and that such toggle is only intended to start movement of the turret body. A spring 83 is used to return the toggle to open position, to keep the pin 81 against the cam 80, and to hold the end 78 against the spindle turret.

Also cooperating in timed relation with the indexing mechanism are means for locking the turret with its spindles in positive alignment. A slidable plug 85, movable in an aperture 86 in the casing 5 and having a suitable projection 87 to engage indentations 88 in the periphery of the turret body 8, is utilized for such locking means. Operating on the lower end of plug 85 is one end of a bell crank lever 89, the other end of which is engaged by a revolving cam plate 90 on the cam shaft 47. A spring 91 tends to force the plug upwardly and keep the bell crank against the cam 90. Means for manually withdrawing the plug and unlocking the spindle turret comprises a pivoted hand lever 92 adapted to have engagement with the end of the bell crank, said lever extending through a hole 93 in the front of the bed plate 1.

*The tool slide*

On the other end of the bed plate, opposite from the spindle turret housing, is mounted an elongated casting 100 formed at its inner end with an enlarged raised boss 101, and at its outer end with an upstanding bracket 102. The boss 101 is provided with a central longitudinal bore 103 in which is slidably mounted a tool carrying member or slide 104, reciprocably movable therein by suitable mechanism carried on a longitudinal shaft 105. One end of the shaft 105 is secured centrally of the tool slide 104, the other end thereof being slidably received in the bracket 102. Means for reciprocating the tool slide is herein shown in the form of a rotatable drum 106 mounted for rotation on the shaft 105 but prevented from longitudinal movement thereof by collars 107 and 108. A portion of the periphery of the drum is provided with a set of gear teeth 109 in engagement with an elongated driven idler 110 mounted in suitable bearings 111 at the rear side of the casting 100, said idler being driven in turn by a gear 112 carried on the cam shaft 47. Also provided in the periphery of the drum is a cam track 113 in which is engaged a cam roller 114 mounted on a stub shaft 115 fixedly secured in the top of casting 100. From the foregoing description it will be apparent that rotation of the cam shaft will cause the gear 112 to rotate the cam drum 106 and, on account of the engagement of roller 114 with the track 113, the drum 106, shaft 105 and the tool slide 104 will be moved longitudinally toward and away from the spindle turret. The idler 110 is of sufficient length that it will be in engagement with gear 109 throughout the entire breadth of its travel.

Figure 43:
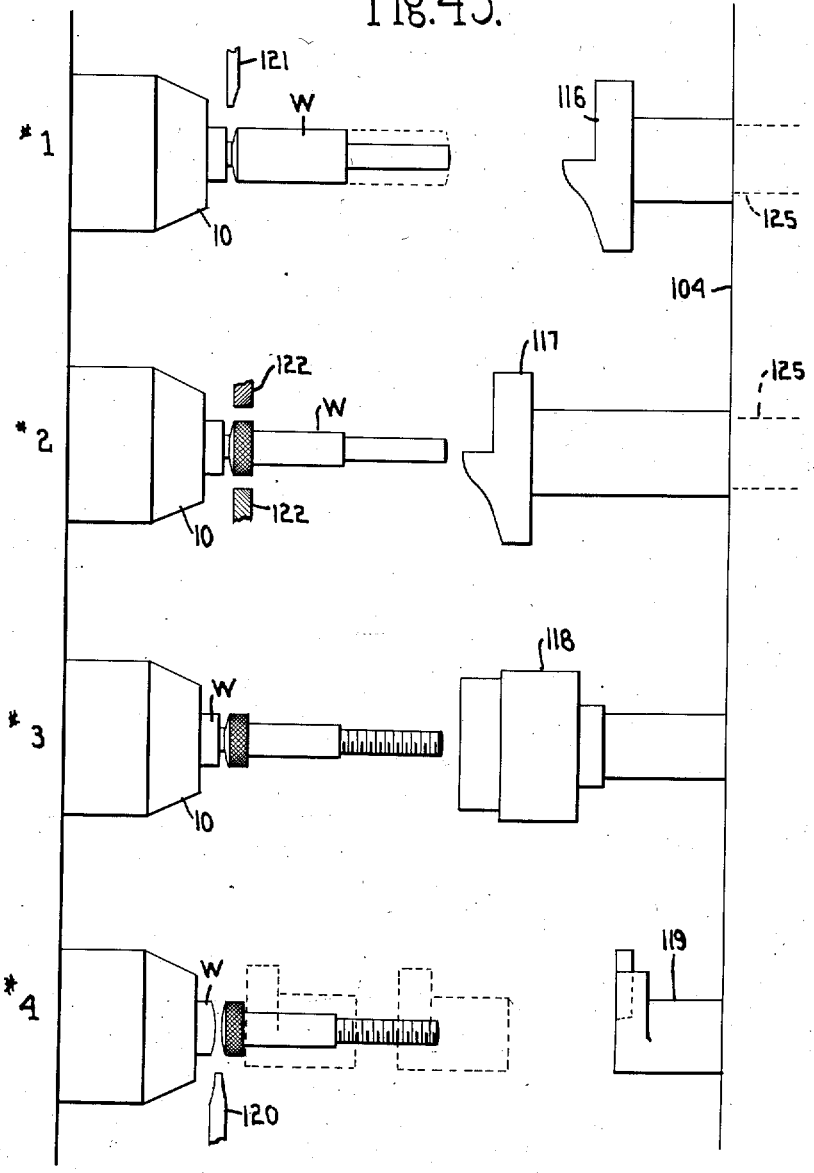
Fig. 43 is an expanded view of the forward end of the spindle turret showing in outline the cooperative relation of a set for forming tools for producing a certain form of article.

Provided in the tool slide is a series of longitudinal apertures in coaxial alignment with the spindles 10, which apertures may be of varied sizes and shapes to receive a series of cutting tools. While the set of tools illustrated in the drawings and to be described in detail is especially adapted to form the particular article illustrated in Fig. 43, it will be understood that the present machine is readily adaptable for various sets of tools to form any specific shape of article within the scope of the machine. Referring more especially to Figs. 21 to 25 and Fig. 43, the following description of the cutting tools will be considered in their sequence of operation taken from the time the blank is first presented to the first cutting tool. For the sake of clearness in understanding, the various stations illustrated in Fig. 43 are numbered consecutively as Nos. 1, 2, 3 and 4, it being obvious that the number of spindles and forming tools may be varied without materially affecting the scope of this invention.

At station 1 the stock W has already been fed forward the desired distance and is ready for operation. Any suitable tool, such as a box mill 116, may be employed to cut away or reduce the body of the stock, as seen in dotted lines in Fig. 43. At the time box mill 116 is operating, a second box mill 117 is performing upon the stock carried in the next preceding spindle, which stock has already been acted on by mill 116. Likewise, the next succeeding spindles are being simultaneously operated on by suitable tools, such as a threading die 118 and a finishing tool 119. At station 4, upon the completion of the action of the finishing tool 119, the finished blank is severed from the stock by a suitable cutting tool 120 carried on a reciprocating horizontal transverse slide to be described hereinafter. The spindle turret is then indexed one station forward, the blanks held in various spindles being presented to the next succeeding cutting tools and a fresh blank supplied in place of the severed one and presented to the mill 116 at station 1. It will therefore be seen that the cutting tools will completely form a blank into the desired article upon each complete reciprocation of the tool turret. If desired, various other cross slide members, which will be described presently, may be employed to further aid in the forming of the article, such tools herein comprising a cutting tool 121 adapted to partially sever the stock into articles of desired length and to partially form a rounded head thereon, and a knurling tool 122 operated in the usual manner.

Figure 22:
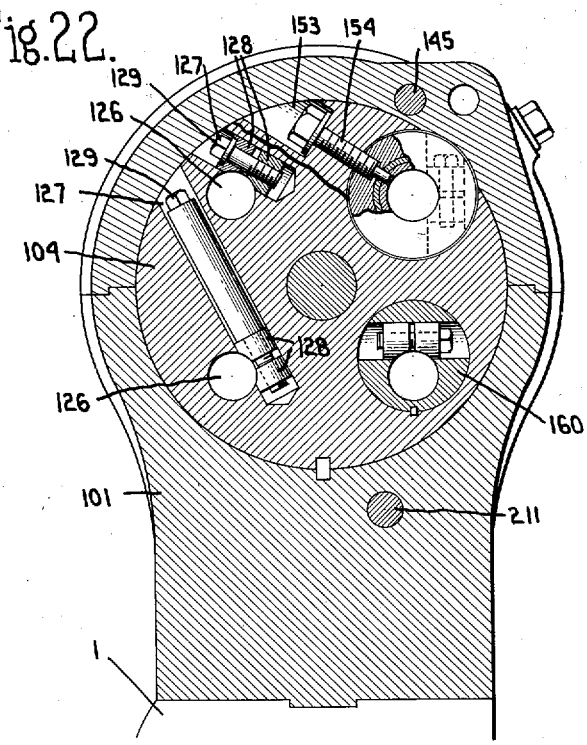
Fig. 22 is a sectional view through the tool slide on line 22—22 in Fig. 16, showing various tool locking devices.
Figure 23:
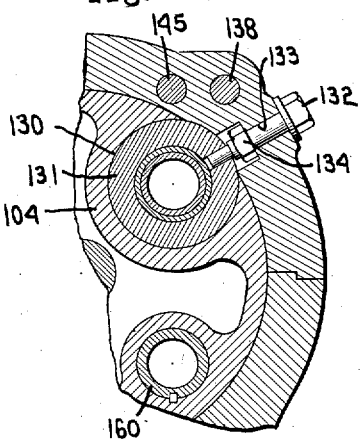
Fig. 23 is a fragmentary sectional view showing adjustable locking means for the die carrying sleeve.
Figure 24:
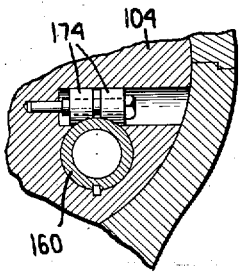
Fig. 24 is a detailed sectional view showing means for locking the accelerating spindle in the tool turret.
Figure 25:
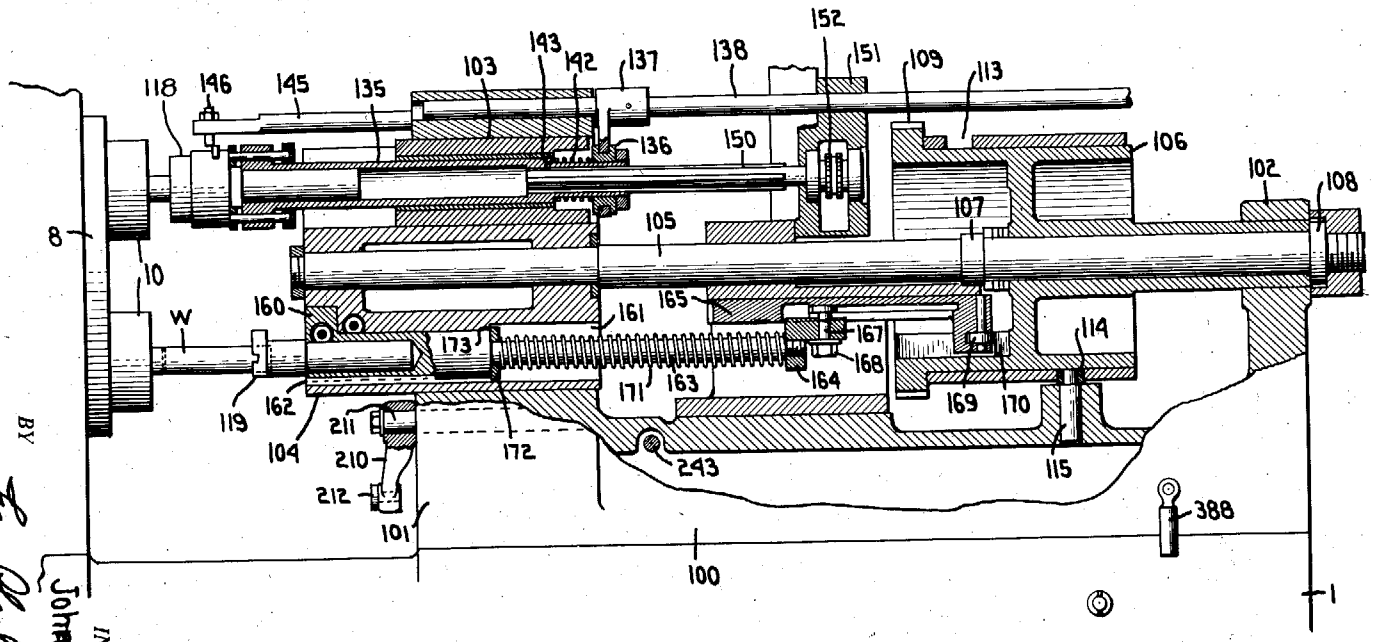
Fig. 25 is a longitudinal sectional view on the line 25—25 in Fig. 21, looking in the direction of the arrows, through the tool slide and its operating mechanism.

The two box mills 116 and 117 are in the present embodiment adapted to be rigidly held in the tool slide. Such mills are ordinarily provided with straight shanks 125 which are adapted to be received in apertures 126 formed in the tool slide. In Fig. 22, numerals 127 indicate holes arranged tangentially with the apertures 126, in which are located a certain form of locking means for securing said box mills to the tool turret. The locking means consists of half nuts 128 adapted to straddle the shanks 125 in apertures 126 and of threaded bolts 129 which tend to draw the half nuts together upon said shanks. Holes 127 are cut in the tool slide in such a way that the locking means is received therein inside the outer periphery of the slide so said locking means does not interfere with the movement of said slide in the boss 101.

Figure 30:
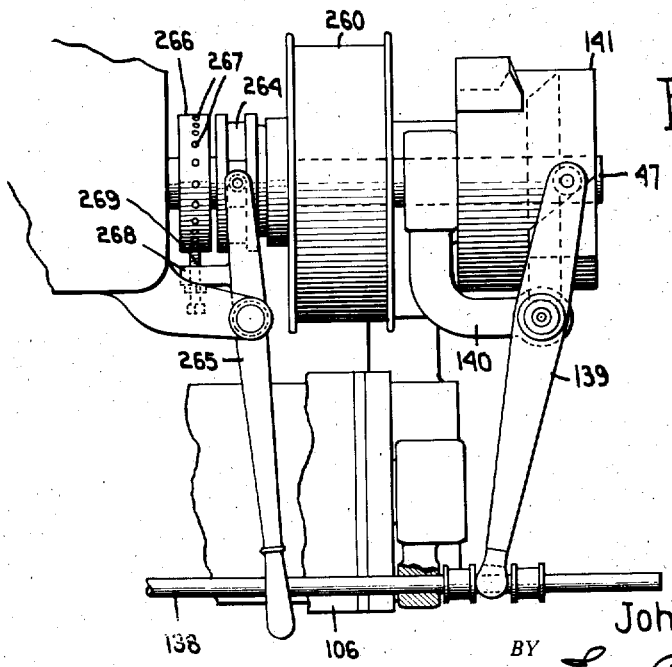
Fig. 30 is a fragmentary plan view of the righthand end of the machine, illustrating the clutch shifter, spindle lock and die operating cam.

The threading die and its operating mechanism are also carried in a longitudinal aperture 103 in the tool slide, the threading die being either of the self opening or solid type. 131 denotes an adjustable bearing sleeve which is carried in the aperture 130, being adjustably held therein by a bolt 132 longitudinally movable in the slot 133 in the boss 101. A nut 134 is used to lock the bolt 132 and sleeve 131 in the desired position. Slidably received within sleeve 131 is a tool holding member 135 carrying at its outer end the threading die and carrying at its rear end a collar 136 which is engaged by a yoke member 137. The yoke member 137 is mounted on a reciprocating bar 138 which is operated, as best seen in Fig. 30, by a lever 139 pivotally mounted on a bracket 140 provided on the casting 100 at the tool slide end of the machine. Means for actuating the lever 139 consists of a cam drum 141 carried on the cam shaft 47. It will readily be seen that movement of bar 138 will impart to the threading die a like movement. In actual use, the threading die is advanced only far enough forward to engage the end of the blank, at which time the cutting elements thereof take hold of the stock, and then to further draw the die on to the stock. A spring 142 is placed between the collar 136 and a flange 143 on the holder 135 to provide a certain amount of flexibility between the threading die and the actuating cam. Mounted in the boss 101 is an adjustable bar 145 carrying at its outer end a stop lug or screw 146 which is adapted to actuate the opening of the threading elements in the usual manner upon the completion of their advanced travel on the blank. As is usual in machines of this character, the threading die is rotated at various speeds, that is, in the threading operation for righthand threads it is rotated at a slower speed than that of the stock held in the spindles, which causes the die to be drawn forward upon the blank, and in the retracting of the die it is driven at a greater speed than the spindles, which causes the die to be threaded off from the blank.

Means for rotating the holder 135 consists of a driven shaft 150 coaxially arranged therewith and provided with splines which maintain the driven connections therebetween but allow the holder 135 to be moved longitudinally of the shaft 150. The shaft 150 is suitably journaled in a bracket 151 mounted upon the casting 100 between the tool turret and the cam drum 106. A sprocket 152 is carried on the shaft 150 which is selectively operated by means to be hereinafter more specifically stated. In case it is desired to utilize the holder 135 for supporting an ordinary stationarily mounted cutting tool in place of the reciprocating threading die, I provide an aperture 153 in the tool slide in which is received a bolt 154 adapted to engage the holder 135 and hold it against longitudinal movement with respect to the tool slide 104. In practice, the bolts 132 and 154 may be identical and interchangeable.

*The accelerating tool holder*

As has been previously stated, this invention produces novel means whereby the speed of one of the tool holders may be accelerated to such a degree that a second tool may be additionally employed for operation upon the same piece of stock during the time consumed in the forward movement of the tool slide. The accelerating tool holder illustrated in the drawings carries a finishing tool which is adapted to smoothly finish the article formed and then be retracted without interfering with the further forward movement of the tool slide, at which time the cutting-off tool is actuated to sever the finished article from the stock bar. It will be apparent to those skilled in the art of machining that any other tools, such as a drill or reamer, may be used in the accelerating tool holder, as is required in the forming of various articles, it also being apparent that it is necessary to withdraw the forming tool from the blank before actuating the cutting-off tool.

The accelerating tool holder is designated in the drawings by numeral 160 and is slidably received in an aperture 161 in the tool turret 104, a spline 162 being provided to prevent turning of the holder. To the rear end of the holder is attached or integrally formed therewith a longitudinally extending rod 163 which projects beyond the tool slide toward the drum 106 and has its end pinned in an adjustable block 164. 165 indicates a reciprocable sliding member which is received in a dovetailed slot 166, formed longitudinally in the bracket 151. The block 164 is adjustably secured to member 165 by a T-head bolt 167 working in a slot in said member and a nut 168. The rear end of the sliding member is designed to enter inside the drum 106, at which end is located a cam roller 169 adapted to be engaged by a cam surface 170 formed on the interior of the drum. It will be obvious that as the drum is moved forward to advance the cutting tools, the holder 160 will also be moved through its connections 165, 166, 169 and 170 with the drum. To accomplish the desired accelerated motion of the holder 160, I form the cam 170 with its surface inclined longitudinally of the drum 106. Hence, as the drum rotates to move the tool slide 104 forward, the cam 170 engages the roller 169 and moves the tool holder 160 forward at a greater rate of speed than that of the tool slide. After the accelerated tool holder has reached its forward position, it is desired to withdraw it so that a second tool carried on a cross-slide may be used during the balance of the forward movement of the tool slide. A spring 171 is coiled about the rod 163, one end of which abuts a collar 172 and the other end of which is engaged by the block 164. Collar 172 is held in the tool slide against a shoulder 173, and it will be seen that, as the sliding member is actuated to advance the accelerating tool holder, the spring 171 will become compressed between collar 172 and block 164. Cam surface 170 is formed with a sharply relieved portion which permits the cam roller 169 to be quickly moved rearwardly by the action of spring 171 after the accelerated tool holder has completed its operation upon a blank. Means are provided for locking the holder 160 against longitudinal movement in the tool slide when it is desired to employ such holder in an ordinary capacity. Said locking means comprises a pair of half nuts 174 similar in construction and operated in a like manner to nuts 128. When this is done, the nut 168 is loosened and the sliding member 165 moved forward out of engagement with the accelerating cam 170.

*The cross-slide mechanism*

Any suitable construction of the cross-slides may be employed within the purview of my invention. Preferably, however, the cross-slides consist of a pair of horizontally reciprocable sliding members and of a vertically reciprocable sliding member, all of said members being provided with means for carrying the forming tools thereon.

Inasmuch as the present invention is designed to be automatically and continuously operated, the cross-slide mechanism comprises means for intermittently reciprocating the sliding members for operation on each set of blanks held in the revolving spindles. In the preferred embodiment of the invention illustrated herein, the two horizontal cross-sliding members comprise a pair of tool carriages 180 and 181 mounted respectively at the front and rear side of the machine. Said carriages are held in the usual manner upon dovetailed bosses 182 and 183 provided on the spindle turret housing and bed plate respectively. The path of travel of the horizontal cross-slides is transverse of the spindles, the front carriage 180 being moved toward the rear of the machine to have the tool carried thereon engage the blank, in this embodiment said tool being adapted to sever the finished article from its stock bar, and the carriage 181 being moved toward the front of the machine to have the tool carried thereon engage the blank in the corresponding station. Means for actuating the carriages comprises a revolving cam drum 184 mounted on cam shaft 47 which is adapted to control the oscillation of a pair of bell cranks 185 and 186 suitably mounted on a bracket 187 provided on the rear side of bed plate 1. The drum 184 is provided on its circumference with the necessary cam plates adapted to move the cranks 185 and 186 in opposite directions. Suitable adjustable rods 188 and 189 are used to connect the carriages 180 and 181 to the cranks 185 and 186 respectively.

Similarly is the vertical cross-slide actuated by suitable connections with the drum 184 to intermittently approach the blank carried in the spindle contiguous therewith. 190 denotes a bell crank pivoted on a shaft 191 which is supported in brackets 192 at the rear of the machine. One end of the crank 190 carries a roller 193 engaging a cam track 194 formed in the end of the drum 184, and the other end of the crank is attached by a rod 195 to a lug 196 provided on the vertical sliding tool carriage 197.

In this embodiment, the tools mounted in carriages 181 and 197 are intended to perform certain of the forming operations upon the blanks held in the spindles 10, as illustrated and outlined at 121 and 122 in Fig. 43. Due to the practical impossibility of machining the spindle turret so that the spindle apertures therein would be of absolutely the same radial distance from the center of said turret, and in order to insure the production of more perfect work, I provide means in connection with each of the carriages 181 and 197 which will limit their travel with respect to the adjacent spindles. Said means comprises a number of adjustable stop screws 198, one for each spindle, located around the periphery of the spindle turret at its forward end. It will be seen that each of such screws may be minutely adjusted so that the distance between them and their corresponding spindle will be exactly the same. Cooperating with said stop screws 198 are other stop screws 199 and 200 suitably mounted in lugs 201 and 202 provided on the carriages 181 and 197 respectively. In operation, the screws 199 and 200 engage the stop screws 198 and insure the same relative travel with respect to the blank carried in each and every spindle.

*The gauge stop*

As previously stated in the preamble to the specification, one of the principal objects of the present invention is to provide in a machine of the character described novel means for gauging the length of stock in the spindles. Heretofore there has been provided means for the same purpose, but such means has required the use and time of a separate operation, i. e., the spindle turret has been provided with a separate station at which the stock was fed and gauged or one of the other stations was utilized and the movement of the forming tools arrested until such feeding and gauging be done, which resulted in the loss of considerable valuable production time. In the present machine, these inexpedient features have been overcome and novel means are provided which are adapted to feed the stock during the indexing operation of the spindle turret and to simultaneously gauge the length of such stock as presented to the forming tools.

Figure 16:
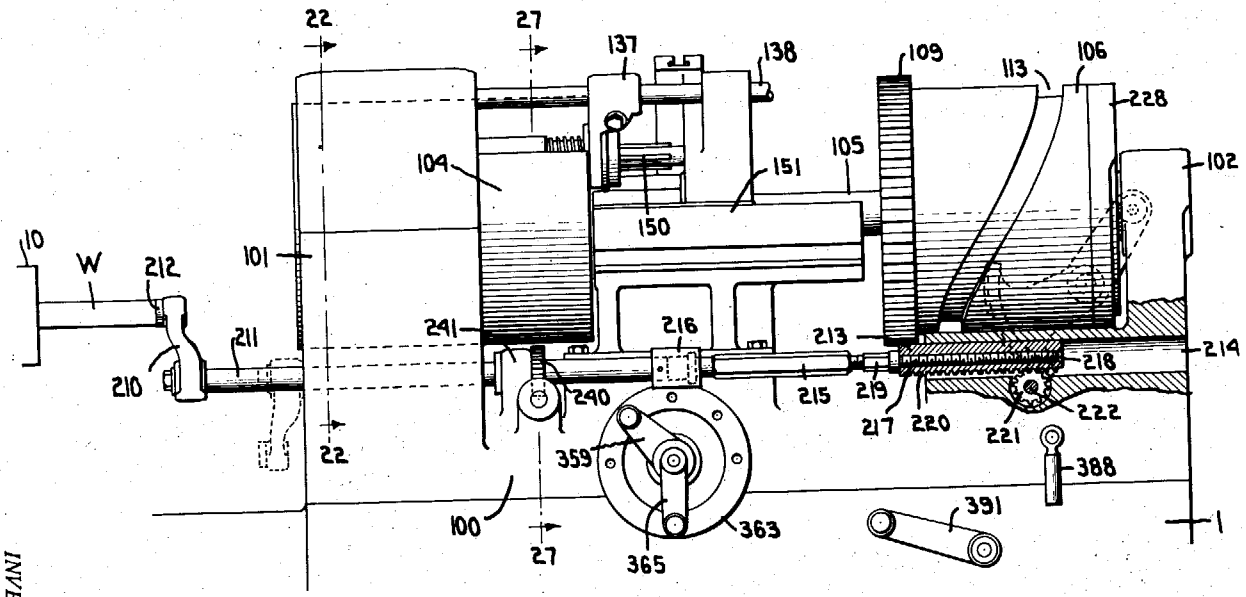
Fig. 16 is a fragmentary front elevation of the righthand or tool slide end of the machine, showing in section the means for reciprocating the gauge stop.
Figure 17:
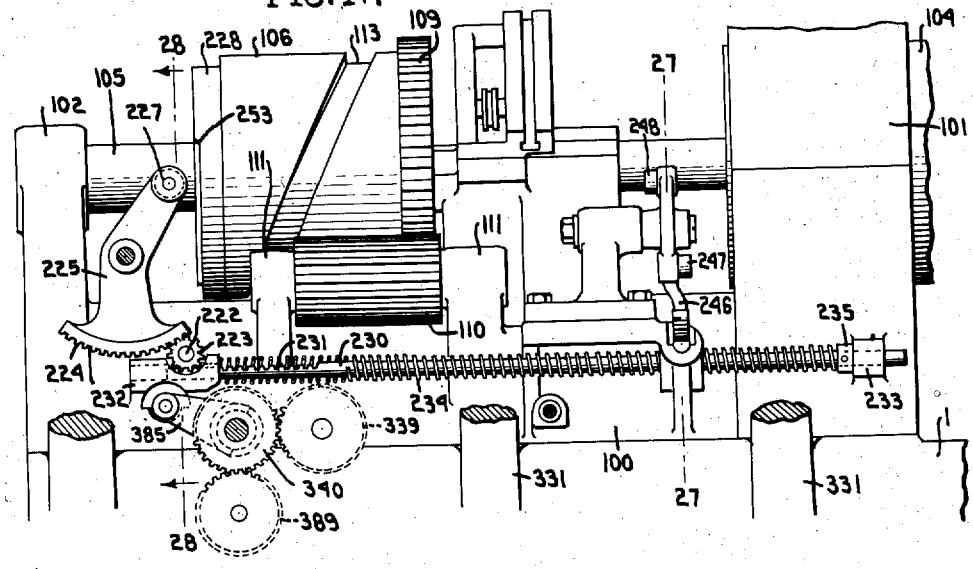
Fig. 17 is a rear elevation of the parts seen in Fig. 16 with the cam shaft omitted for sake of clearness.
Figure 18:
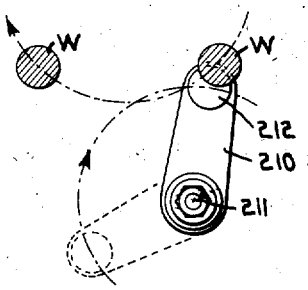
Figs. 18 and 19 are diagrammatic detail views showing the relative position of the gauge stop and the spindle turret in various positions.
Figure 19:
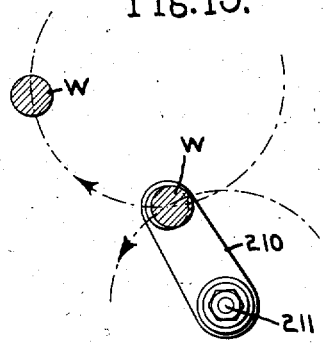
Figure 20:
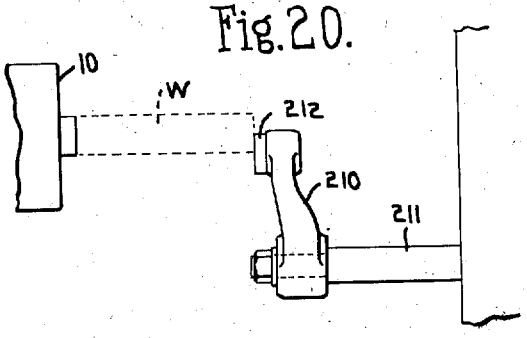
Fig. 20 is a side elevation of Fig. 18.
Figure 21:
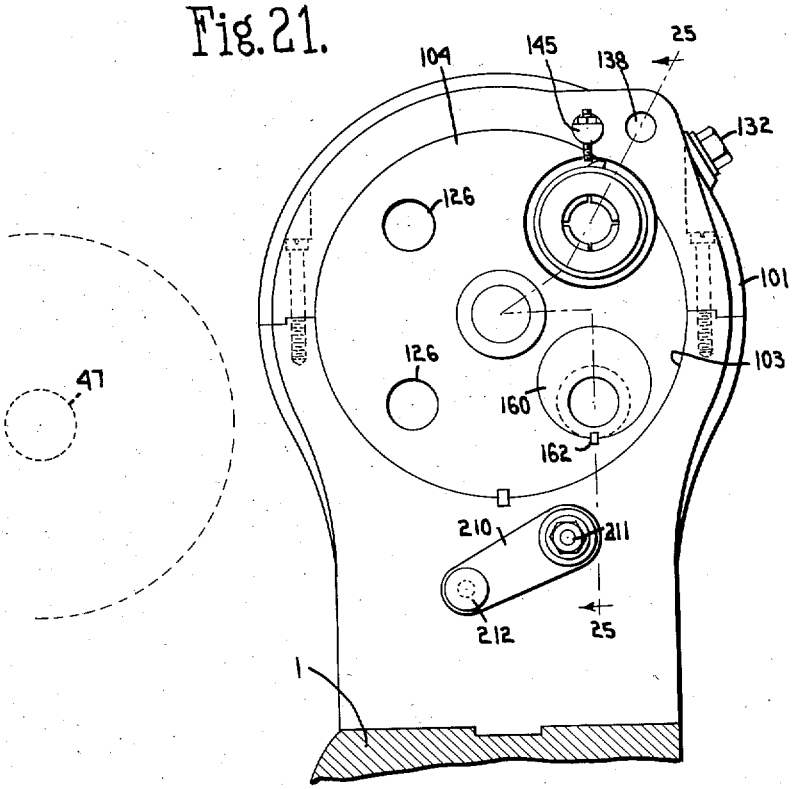
Fig. 21 is an end elevation of the tool slide looking in the opposite direction from the arrows on line 15—15 in Fig. 1.
Figure 26:
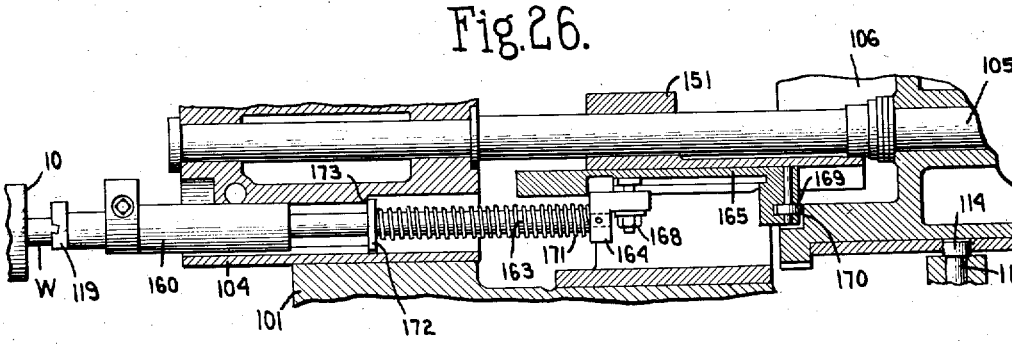
Fig. 26 is a longitudinal sectional view through the accelerating spindle in the tool slide showing the parts in a different position to that shown in Fig. 25.

The gauge stop and operating mechanism therefor, as illustrated in the drawings in Fig. 1 and Figs. 16 to 28, comprise a movable arm 210 carried on an actuating rod or shaft 211 and provided at its outer end with a stock engaging stud 212, the specific form of which may be varied to accommodate various sizes and shapes of stock. The lever 210 is normally positioned close to the front end of boss 101. Rod 211 is mounted for longitudinal movement in boss 101, said rod also being adapted for oscillatory movement therein. Attached to the rear end of rod 211 is suitable mechanism for reciprocating the gauge stop. 213 designates a reciprocating member slidably received in the longitudinal aperture 214 provided in the casting 100 and 215 denotes an adjustable connecting rod adapted to secure rod 211 and member 213 together. The ends of rod 211 and adjusting rod 215 are joined by a coupling 216 which permits the rod 211 to be rotated independently of rod 215. Means for effecting the adjustment of rod 215 consists of a threaded portion 217 provided thereon in engagement with a threaded aperture 218 in the member 213 and of a lock nut 219. The gauge stop device shown herein is intended to be actuated in timed relation with the reciprocatory movement of the tool slide, and it has been found convenient to utilize the movement of cam drums 106 through suitable connections to impart to the gauge stop the desired intermittent reciprocation. The sliding member 213 is provided on its surface with a set of rack teeth 220 in engagement with a pinion 221 mounted on a transverse shaft 222 which is journaled in the casting 100. On the rear end of shaft 222 is carried a second pinion 223 adapted to have engagement with segmental gear teeth 224 provided on one end of a pivoted bell crank lever 225. Lever 225 is pivotally mounted on a lug 226 formed on a rearward extension of the bed plate 1. The other end of crank 225 carries a cam roller 227 which is so positioned as to have engagement with a cam plate 228 secured to the rear end of drum 106. As best seen in Figs. 16 and 17, which illustrate different positions of the bell crank lever, the cam drum in its rear movement of retracting the tool turret engages the roller 227 and consequently rotates the shaft 222 to move the gauge stop toward the spindle turret. Means for returning the gauge stop to normal position and for keeping the roller 227 against the cam 228 herein comprises a longitudinally arranged reciprocable bar or rod 230 which is provided at one end with rack teeth 231 in engagement with pinion 223. The ends of the rod 230 are slidably received in bosses 232 and 233 formed on the rear side of casting 100. A spring 234, carried on rod 230 and confined between boss 232 and a collar 235 pinned on said rod, acts to keep the bell crank with the roller 227 in contact with cam 228. It will be apparent that as the tool slide is advanced upon the blanks, the spring 234 will return the gauge stop to normal position.

Figure 27:
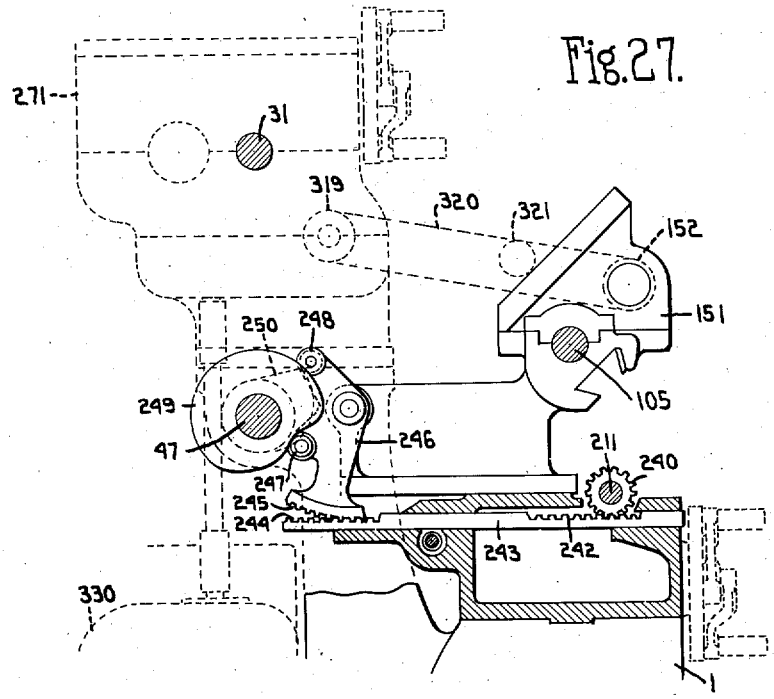
Fig. 27 is a cross-sectional view through the tool slide bed on line 27—27 in Figs. 16 and 17, showing in detail the means for oscillating the gauge stop.
Figure 28:
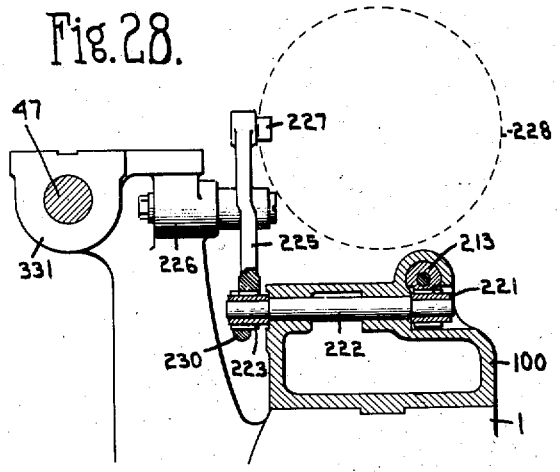
Fig. 28 is a detailed sectional view taken on the line 28—28 in Fig. 17.
Figure 29:
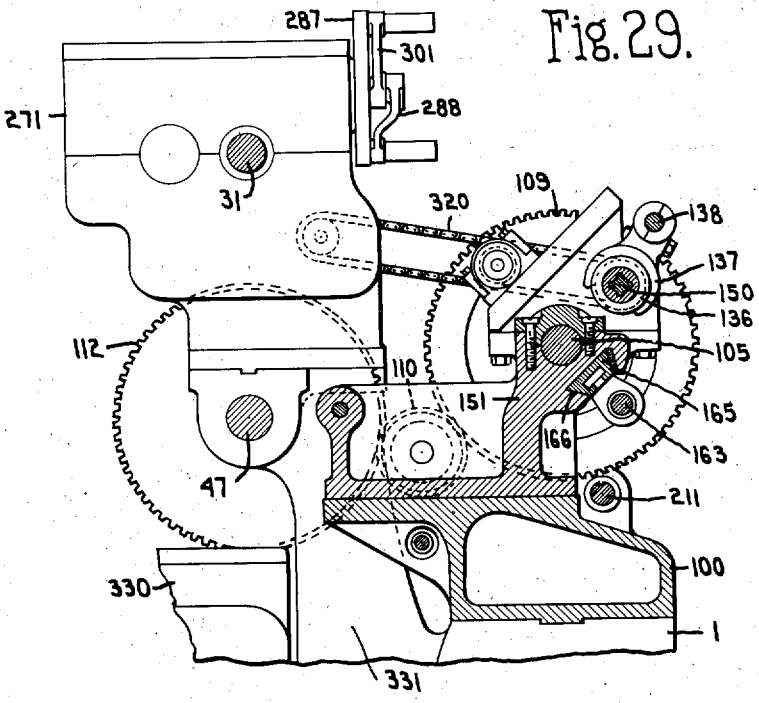
Fig. 29 is a cross-sectional view through the tool slide bed taken on the line 29—29 in Fig. 1 and showing in elevation the upper or spindle drive gear box.

Thus far the above description of the gauge stop actuating mechanism relates to means for reciprocating the gauge stop. Inasmuch as this invention is designed to have the gauge stop perform its function upon the advancing stock during the turning or indexing of the spindle turret, it is necessary to provide means for imparting an oscillatory movement to the gauge stop. As previously stated, the rod 211 which carries the gauge stop arm 210 is mounted for both reciprocation and oscillation in the boss 101. A gear 240 is keyed to rod 211, said gear being held from longitudinal movement against a boss 241 provided on casting 100. Engaging gear 240 are rack teeth 242 formed at the front end of a rack rod 243 which is transversely carried in suitable bearings provided in the casting 100. The rack rod is also provided at its rear end with teeth 244 which are engaged by segmental gear teeth 245 provided on one end of a pivotally mounted bell crank lever 246. Lever 246 carries at each side of its pivot a pair of cam rollers 247 and 248 which are actuated by revolving cams 249 and 250 mounted on cam shaft 47. Referring to Fig. 27, it will be seen that the cams 249 and 250 act to positively control the position of gear 240 and consequently the arcuate position of the gauge stop at all times, it being obvious that such cams are so timed as to cooperate with the indexing mechanism of the spindle turret.

In the use of my machine, the stock feeding mechanism is adapted to feed the stock forward a slight distance further than necessary and the gauge stop is intended to force said stock back to the exact desired length. This construction insures the production of a more uniform article. To accomplish this, the cam 228 is provided with a stepped portion 253 which works in timed relation to engage the roller 227 to force the gauge stop forward.

*The driving and speed regulating mechanism*

A very important feature of the present invention resides in the mechanism for driving the several operative parts of the machine together with means for easily and quickly changing the speed of such driven parts. In all machines of this character there is provided a driving means and a speed changing mechanism which ordinarily consists of a nest of change gears. It has been necessary, in such machines, in changing from one set-up to another to substitute or manually rearrange the position of the gears in such nest to obtain the desired change in speed of the various driven elements. It will be obvious that such changes required considerable time and calculation and necessitated the storing up of all the extra gears needed to make the machines applicable for various uses. In the present novel machine I provide in connection with the driving mechanism one or more suitable self-contained differential gear boxes which are intended to regulate the speed of the spindle drive and of the tool turret feed. Means, such as a number of hand-operated levers cooperating with a tabulated dial, may be employed to effect the desired change in relation of the gears contained in the differential gear boxes. This invention also contemplates suitable mechanism whereby the ratio of speed between the spindles and the tool feed may be held constant, regardless of the changes made in the speed of such spindles, that is, if the tool feed speed is set at a certain distance per revolution of the spindles, the mechanism herein provided will automatically increase or decrease such tool feed speed proportionately with changes made in the speed of the spindles.

Means for driving the machine may consist of a driven pulley 260 operated from a belt 261, which is carried at one end of a machine upon a longitudinally extending shaft 262 journaled in suitable brackets 263. A friction clutch 264 of any desired type is employed to connect such driven pulley with the operating mechanism of the machine. A hand lever 265 is adapted to control the operation of a clutch 264, said lever being positioned at the front of the machine within convenient reach of an operator. Sometimes in the setting up of the machine it is desired to lock the spindles and other mechanism from turning, and in this invention the locking means therefor is provided in connection with the hand lever 265. 266 denotes an annular collar member mounted on one side of the clutch 264 and having its periphery provided with a plurality of radial apertures 267. Extending from lever 265 is a lug 268 carrying therein an adjustable screw 269 which is adapted to be engaged in one of the apertures 267 when it is desired to lock the movement of the machine. As seen in Fig. 30, it will be obvious that when the screw 269 is engaged with the disk 266 the clutch and lever 265 will be rendered inoperative; also the driven shaft upon which the disk 266 is carried will be held from turning.

The entire mechanism of the machine is actuated from a shaft 270 referred to above as the driven shaft actuated by the clutch 264. The shaft 270 is journaled in a differential gear box 271, which gear box will be herein termed as the spindle drive gear box and which may be conveniently located adjacent the pulley 260 at the rear side of the machine at the tool turret end.

Figure 33:
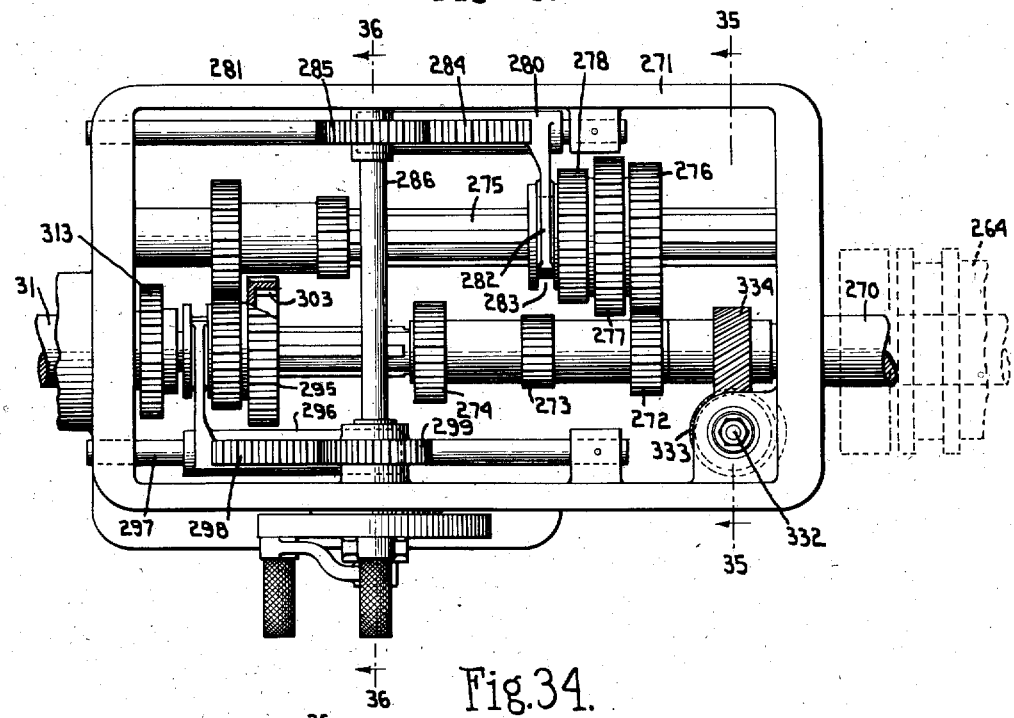
Fig. 33 is a plan view of the gear shifting mechanism within the spindle drive box as seen from line 33—33 in Fig. 35.
Figure 34:
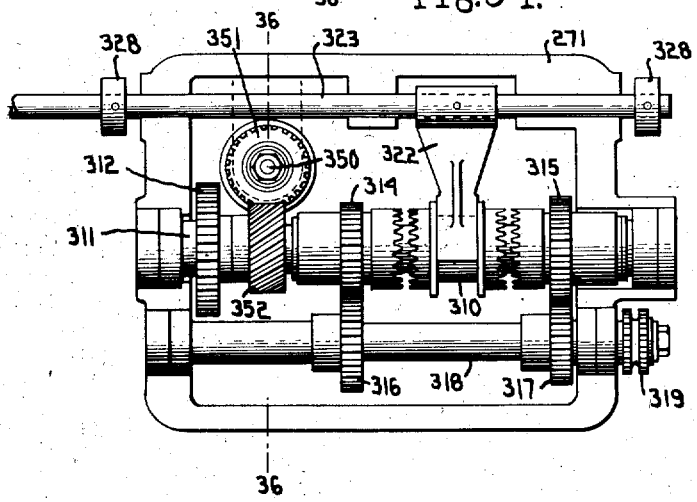
Fig. 34 is a view on line 34—34 in Fig. 36, showing in elevation the die speed regulating clutch.
Figure 35:
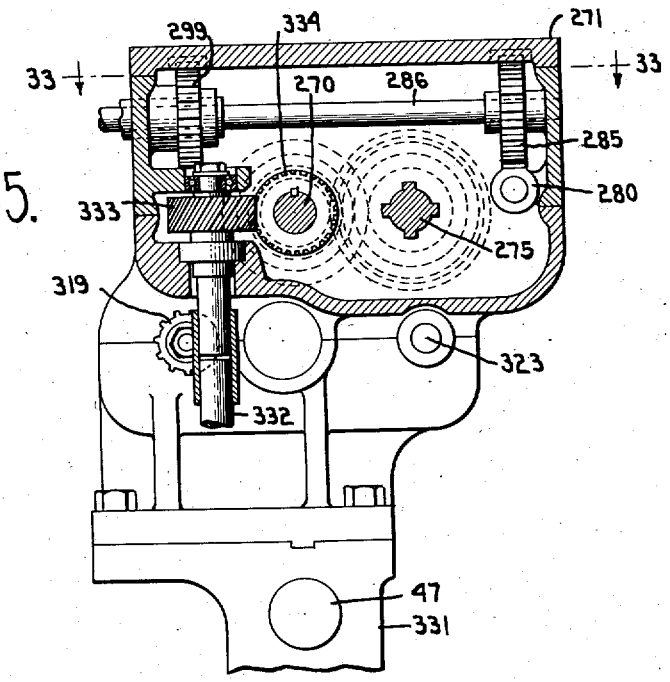
Fig. 35 is a cross-sectional view on line 35—35 in Figs. 32 and 33.
Figure 36:
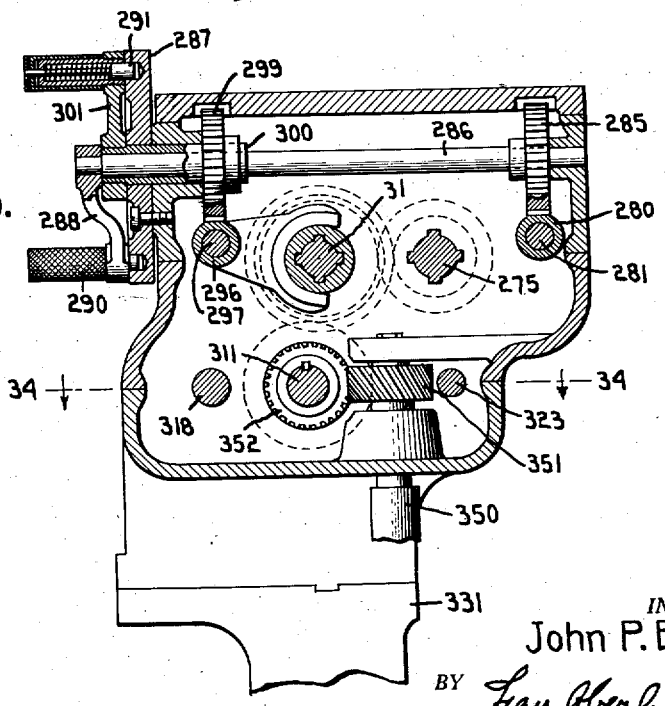
Fig. 36 is a sectional view on line 36—36 in Figs. 32 and 34.
Figure 37:
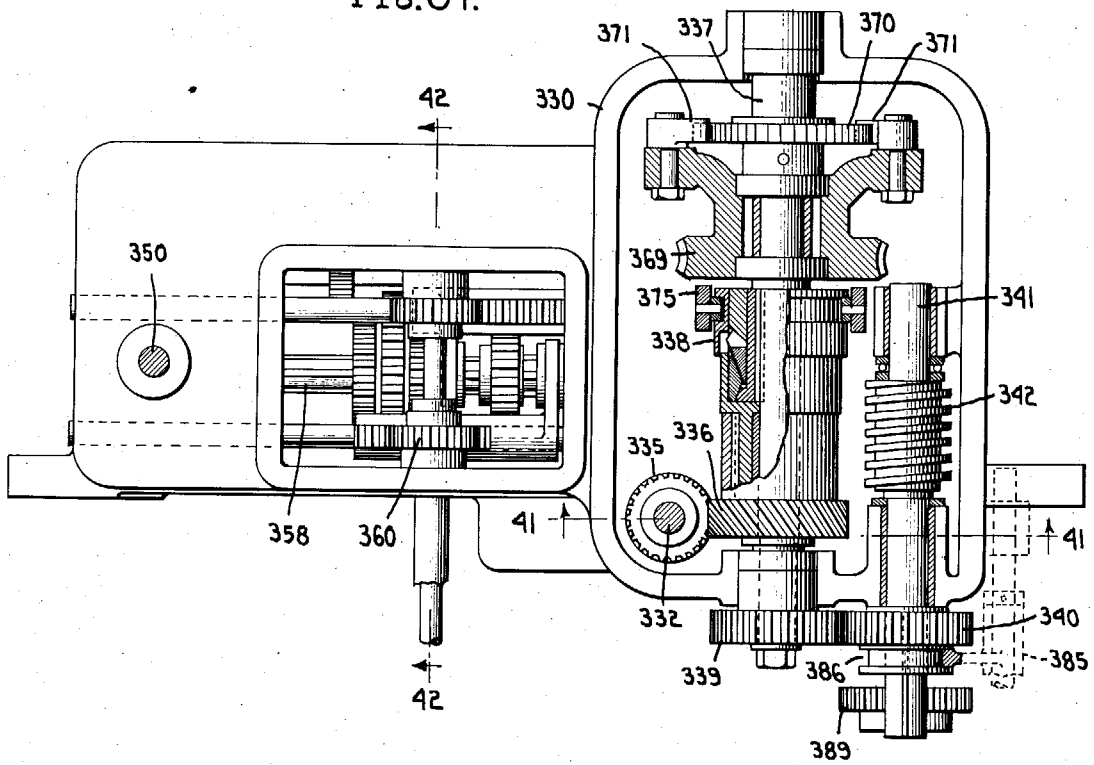
Fig. 37 is a view on the line 37—37 in Figs. 32 and 41 through the lower or tool turret feed gear box.
Figure 38:
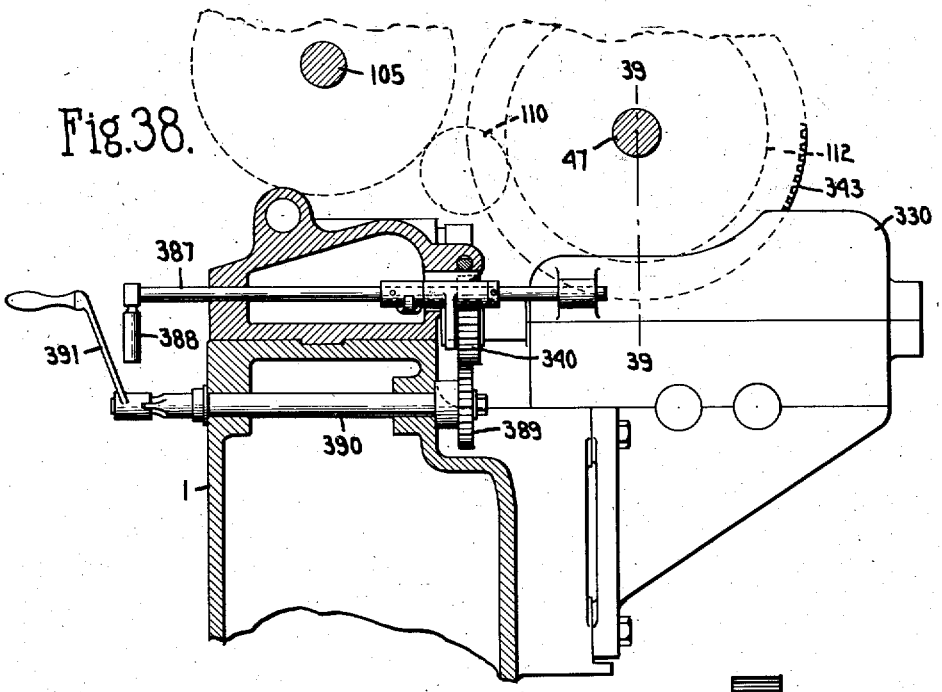
Fig. 38 is a cross-sectional view on line 38—38 in Fig. 32 showing in detail mechanism for turning the operating parts of the machine by hand.
Figure 39:
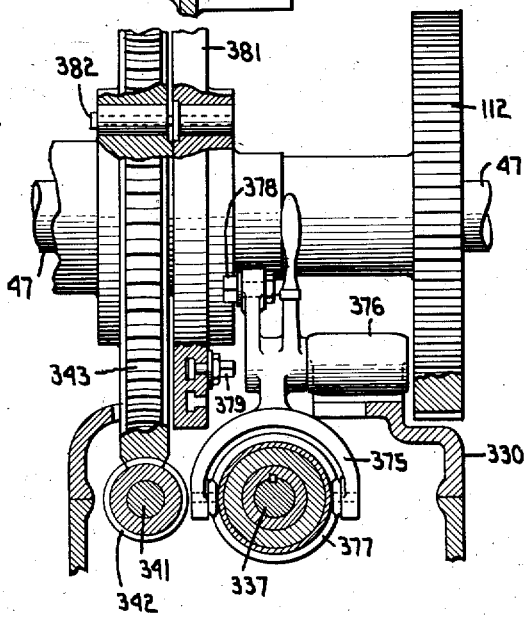
Fig. 39 is a sectional view through the lower gear box on line 39—39 in Fig. 38, showing the idle motion clutch operating mechanism.
Figure 40:
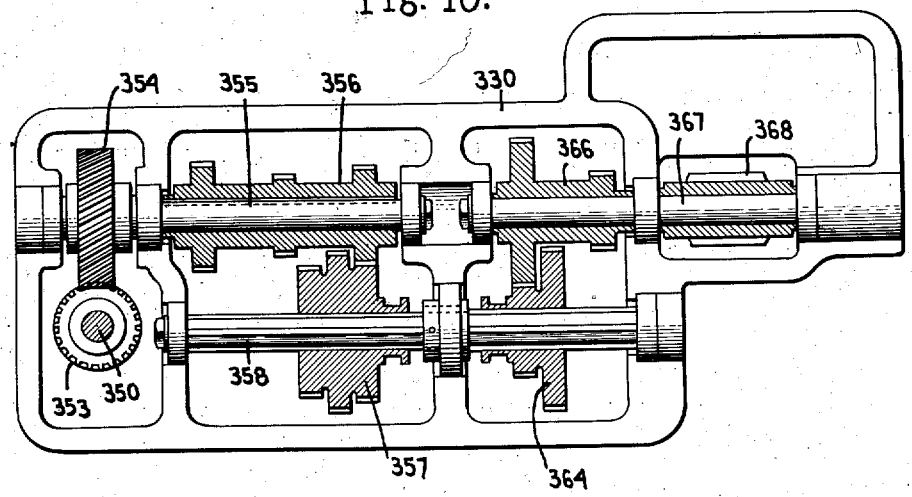
Fig. 40 is a horizontal longitudinal section on line 40—40 in Figs. 32 and 42.

The shaft 270 is adapted to drive the spindle drive shaft 31 through the medium of various differential change gears contained within the gear box 271. The shafts 270 and 31, as seen from Fig. 33, are coaxially aligned, each entering the box 271 from opposite ends and having their adjacent ends revolubly secured together, the purpose thereof being to provide a central support for the shafts within the gear box and also to allow them to be turned independently of each other. Mounted on the shaft 270 is a cluster gear consisting of several pinions 272, 273 and 274. 275 indicates a short shaft mounted parallel with the shafts 270 and 31 within the box 271. Carried on the shaft 275 is a second cluster gear comprising several pinions 276, 277 and 278 adapted to cooperate respectively with the pinions 272, 273 and 274. Said last mentioned gear is slidably mounted on shaft 275 so that said gear may be moved longitudinally to have its pinion selectively engaged with the pinions on said first named cluster gear, which construction is similar to the usual differential gear shifting mechanism. Means for controlling the sliding movement of the cluster gear on shaft 275 comprises a sliding sleeve 280 mounted on a longitudinally arranged rod 281 and having a yoked portion 282 which engages an annular groove 283 provided at one end of said gear. The surface of the sleeve 280 is provided with rack teeth 284 in engagement with a pinion 285 mounted on a transverse shaft 286. Shaft 286 extends through the front wall of the gear box 271 and centrally through a tabulated dial 287 secured to said front wall. Mounted on the outer end of said shaft is a hand operated lever 288 by which the sliding movement of the cluster gear is controlled through the pinion 285 and sliding sleeve 280. The lever 288 and dial 287 cooperate in the ordinary manner, the dial being provided with a plurality of spaced apertures 289 and the lever being provided with a handle 290. A spring-pressed plug 291 actuated by said handle is employed to engage the apertures 289 to hold the lever 288 in the desired position. Shaft 31 also carries a slidable cluster gear 295 similarly controlled by a sliding sleeve 296 mounted on a longitudinal rod 297, said sleeve being provided with rack teeth 298 in engagement with a pinion 299. Pinion 299 is mounted on a sleeve 300 which surrounds the shaft 286 and extends through the gear box wall and the dial 287, a hand operated lever 301 being secured to its outer end for controlling the sliding movement of the cluster gear 295. Secured to the shaft 275 adjacent the gear 295 is still another cluster gear 302, which is adapted to be selectively engaged by said gear 295. It will be obvious that from an understanding of the above and with particular reference to Fig. 33 many changes in the speed of spindle drive shaft 31 are easily and readily obtainable. Power is first transmitted to the shaft 270 which carries the pinions 272, 273 and 274 and then from any one of said pinions to the cluster gear composed of pinions 276, 277 and 278 which drive the shaft 275. Shaft 275 in turn carries the cluster gear 302 which is engaged by complementary gears 295 mounted on the shaft 31. If it is desired to have a direct driving connection between shafts 270 and 31, the gear 295 may be provided with a set of internal gear teeth 303 which engage over the pinions 274, the movement of gear 295 being controlled by the hand lever 301.

Figure 31:
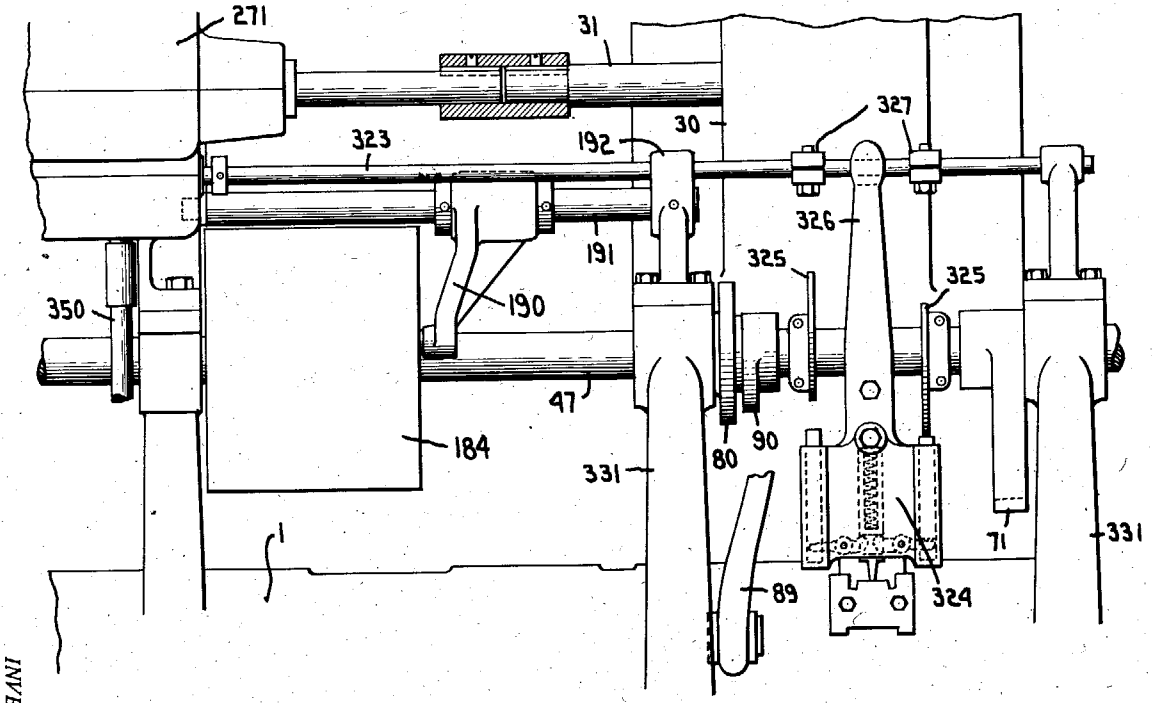
Fig. 31 is a rear elevation of the spindle end of the machine showing the die clutch shifting mechanism.
Figure 32:
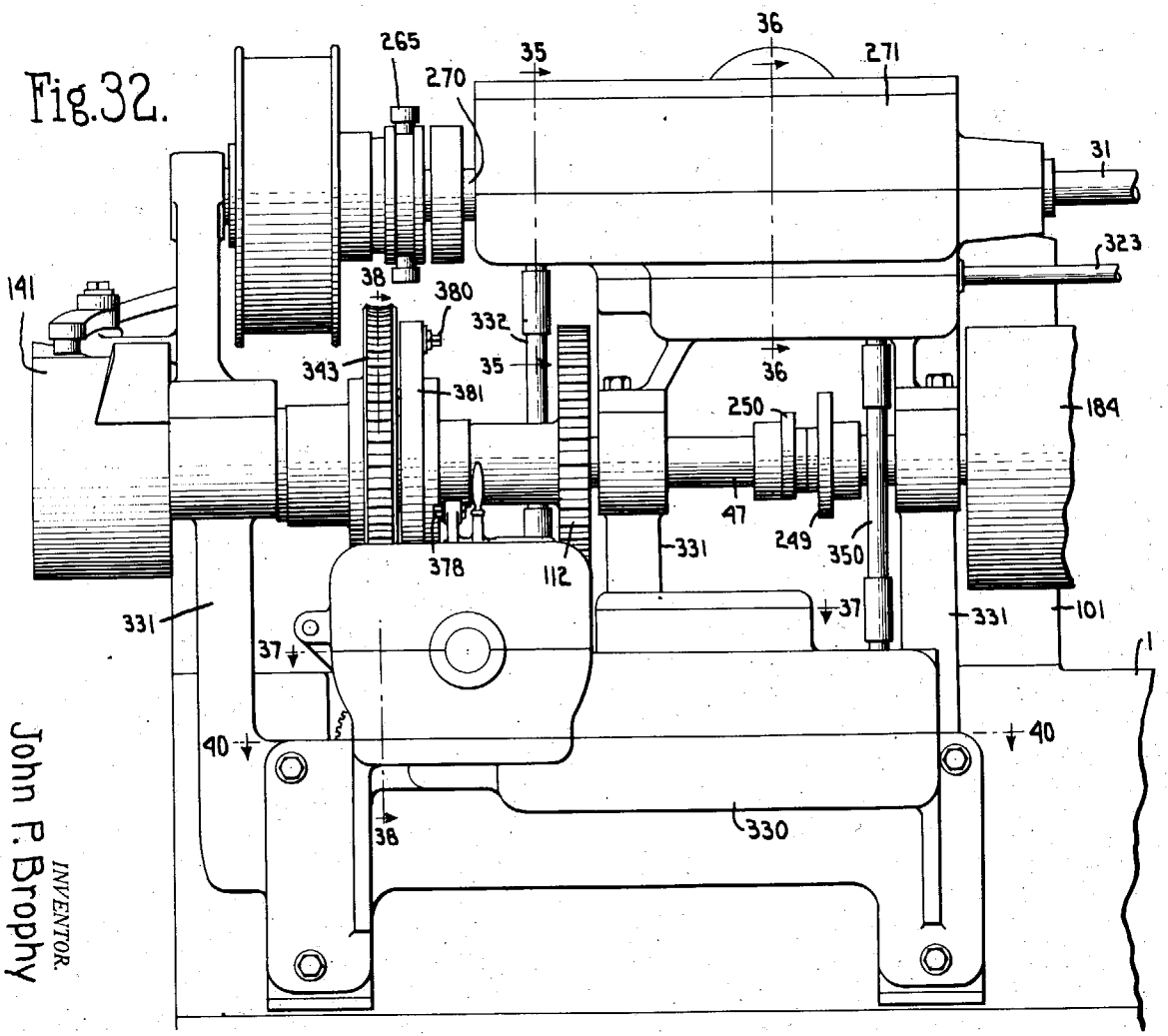
Fig. 32 is a rear elevation of the other end of the machine showing the relation and mounting of the differential gear boxes.

Also carried within the differential gear box 271 is suitable mechanism by which the threading die is rotated at various speeds, the purpose of variation in the speed of the threading die being heretofore explained. Said means consist of a sliding clutch member 310 carried on a shaft 311 which is driven through a gear 312 in engagement with a gear 313 carried on the shaft 31. The clutch 310 is actuated by suitable mechanism, as will be presently described, to engage one of a pair of pinions 314 and 315 loosely mounted on the shaft 311, one at either side of said clutch. The pinions 314 and 315 are of different diameters and they engage other pinions 316 and 317 respectively mounted on a shaft 318. Shaft 318 extends through the wall of the gear box 271 and carries on its end a sprocket wheel 319 which is suitably connected by a chain 320 to the sprocket 152 mounted on the threading die rotating shaft 150. An adjustable idler 321 may be provided in connection with bracket 151 to take up the slack in chain 320. The clutch member 310 is engaged by a yoke 322 which is reciprocated to effect the engagement of said clutch with either of the gears 314 and 315. Means for controlling the reciprocation of yoke 322 comprises a sliding bar or rod 323 longitudinally carried in suitable bearings provided in the gear box 271. The rod 323 is adapted to be automatically controlled to cause the threading die to be rotated at various speeds at the correct time. Means for automatically controlling the reciprocation of said rod is herein shown, as best seen in Fig. 31, in the form of the ordinary shifting device 324, as set forth in the patent to Clyne, No. 554,813, of February 18, 1896. Said device is controlled by suitable cams 325 carried on the cam shaft 47 and has an oscillating arm 326 thereon which engages between a pair of stop lugs 327 on the rod 323 to move said rod in either direction. Further detailed description of said shifting device is deemed unnecessary as no specific claim is made by this invention thereto. Adjustable collars 328 are provided on the rod 323 at each side of the gear box 271 to limit the movement of the clutch actuating yoke 322.

In machines of the present character it is customary to provide what is known as an idle motion drive in connection with the feeding mechanism of the tool slide. Such mechanism is actuated to speed up the feed of the tool slide during its initial movement, at which time the forming tools are not yet engaged with the blanks and then to automatically reduce the feed speed of said tool slide during the forming operation. In the present machine, the idle motion mechanism is controlled by suitable driven connections operated from the mechanism in the differential gear box 271. The idle motion mechanism and also means for regulating the proportionate feed speed of the tool slide are carried in a second gear box 330, which is herein shown as secured to the rear side of the bed plate 1 beneath the gear box 271.

Figure 41:
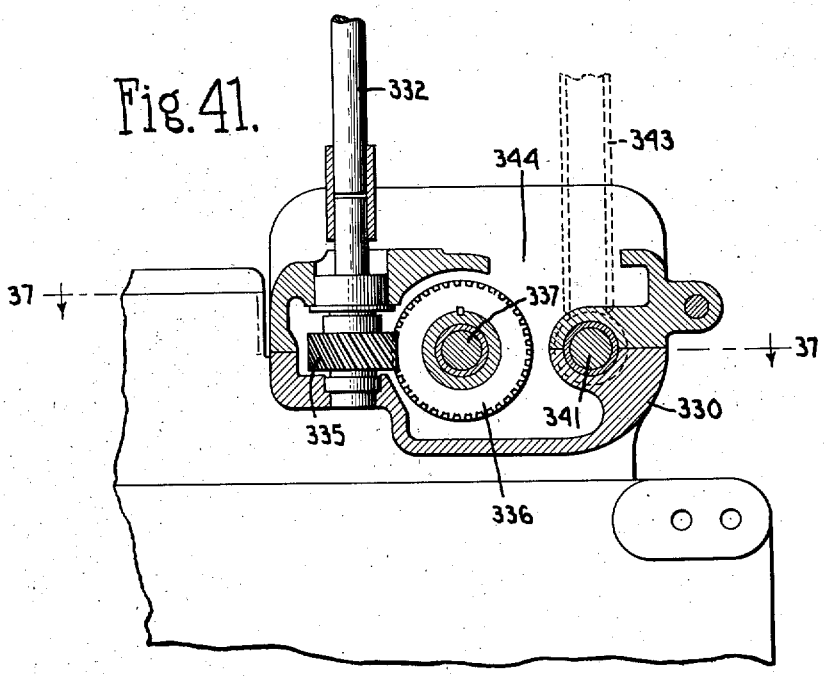
Fig. 41 is a sectional view taken on line 41—41 in Fig. 37.

The cam shaft 47 heretofore referred to is mounted for rotation in a number of rearwardly projecting arms or brackets 331 provided on the bed plate 1. The cam shaft 47 is rotated by suitable gearing carried in the gear box 330. 332 designates a vertical shaft provided on its upper end with a spiral gear 333 in engagement with a spiral gear 334 on the shaft 270, said shaft extending from the gear box 271 to the box 330 and provided on its lower end with a spiral gear 335. Gear 335 meshes with a spiral gear 336 carried for rotation on a horizontal shaft 337 journaled in the gear box 330. Driving connection between gear 336 and shaft 337 is controlled by a sliding clutch sleeve or member 338 of any ordinary construction, the actuating means therefor to be presently described. The shaft 337 projects beyond the forward wall of gear box 330 and carries thereon a gear 339. Normally adapted to engage gear 339 is a second gear 340 slidably mounted on a shaft 341 carried parallel with shaft 337 in the box 330. Also mounted on shaft 341 is a worm gear 342 which drives a worm wheel 343 carried on cam shaft 47. Gear box 330, as shown in Fig. 41, is cut away to receive the wheel 343, as at 344. It will be seen therefore that motion is imparted to the cam shaft 47 from the driving pulley of the machine through shaft 270, shaft 332, clutch member 338 and the worm gear 342. As will be described presently, the shaft 337 is being constantly rotated irrespective of the engagement of clutch 338 when the machine is in motion. The purpose of the drive through shaft 332 and said clutch member is to provide the idle motion referred to above, which is intended to speed up the rotation of the cam shaft during the first part of the tool turret travel.

A second vertical shaft 350 is provided in connection with the spindle drive gear box 271, and the lower gear box 330, which shaft is intended to actuate the tool slide feeding mechanism and the cam shaft 47 under normal conditions, i. e., when the idle motion is not operating. Shaft 350 carries at its upper end a spiral gear 351 meshing with a spiral gear 352 carried on the shaft 311. The lower end of shaft 350 extends into the lower gear box 330 and carries thereon a second spiral 353 which meshes with a spiral gear 354 mounted on a horizontal shaft 355 which is suitably journaled in the box 330. Shaft 355 carries a cluster gear 356 of the same general type referred to above which cooperates with a slidably mounted cluster gear 357 to drive a shaft 358 which is mounted parallel with the shaft 355. The cluster gear 357 is actuated to slide over the shaft 358 by means of a hand operated lever 359 which is located at the front of the machine within convenient reach of an operator. The lever 359 is constructed similarly to the levers 288 and 301 and controls the movement of gear 357 through a pinion 360, sliding member 361, and a yoke 362. Likewise is the lever 359 used in connection with a tabulated dial 363. The shaft 358 also carries a second slidably mounted cluster gear 364 which is actuated by suitable similar mechanism from a hand lever 365 operating in connection with dial 363. The gear 364 is selectively engaged with a cluster gear 366 mounted on a shaft 367, said shaft being arranged longitudinally or at right angles to and beneath the shaft 337. Driving connection is established by the shafts 367 and 337 through a worm gear 368 mounted on shaft 367 and a worm wheel 369 carried on shaft 337.

As has been previously stated, the shaft 337 is at certain times actuated by the idle motion mechanism to an increased rotation. Consequently it is necessary to provide certain mechanism to permit said increased rotation without affecting the drive of shaft 367. Such mechanism may comprise the loose mounting of worm wheel 369 on shaft 337 together with a ratchet wheel 370 and spring pawls 371 carried by the worm wheel 369, the pawls and ratchet being adapted to turn the shaft 337 in one direction only and to permit said shaft to be rotated in the same direction at a faster rate of speed without affecting the rotation of the worm wheel 369.

The means for actuating the clutch sleeve 338 is constructed as are all the operating elements of the present machine to be operated automatically. Said means comprises a yoked lever 375 pivotally mounted in a bracket 376 provided on the top of gear box 330, said yoke engaging in an annular recess 377 in the sleeve 338. The upper end of the lever 375 carries a cam lug 378 which is intermittently engaged by cam lugs 379 and 380 to throw the clutch sleeve into or out of operative relation. The lugs 379 and 380 are adjustably mounted in annular grooves provided in a retaining disk 381 carried on the cam shaft 47, the adjustment being provided to allow for variation in the idle motion drive as is required in the forming of different articles. As is usual in automatic machines, a braking pin 382 may be provided in connection with the worm wheel 343 and the cam shaft 47, such pin being able to withstand ordinary strain but being adapted to shear off if any part on the machine should become jammed.

The purpose of slidably mounting the gear 340 on the shaft 341 is to provide means for turning the cam shaft by hand as is sometimes necessary in making certain adjustments. 385 denotes a reciprocable yoked member engaging an annular recess 386 provided on gear 340, said member being mounted for reciprocation on a manually operated rod 387 which extends transversely through the machine and is provided with a handle 388. It will be obvious that when the gear 340 is pulled from engagement with the gear 339 the cam shaft 47 may be rotated independently of the driving mechanism. Means for manually turning said cam shaft resides in a gear 389 positioned beneath the shaft 341 so as to engage gear 340 when it is pulled out of engagement with gear 339. Gear 389 is carried on a transverse shaft 390 which extends through the front of the bed plate and may be operated by a hand lever 391.

The operation of the present machine is very simple and accomplishes its functions automatically and continuously. To start and stop the machine, the hand lever 265 is moved to engage or disengage the driving pulley 4 with the shaft 270 from which are actuated all of the several operative elements of the machine. The various steps in the operation of the machine are clearly shown in the drawings and have been clearly pointed out in the foregoing description. The stock is supplied to the several revolving spindles where it is gripped and acted upon by several automatically operated forming tools. A blank is first subjected, after the gauging thereof, to the forming tool at the first station (as indicated at the top of Fig. 43), after which the spindle turret is indexed to present the same blank to the next succeeding station, and so on is the spindle turret intermittently indexed step by step to present said blank to the subsequent forming tools. At the last station, after the operation of the forming tool, which is herein provided with an accelerated movement, the blank is severed from the stock. The stock is then automatically fed forward and gauged and the forming steps repeated. As each of the spindles is adapted to carry stock bars, each time the forming tools operate one blank will be completely formed and cut from its stock bar.

It will be obvious from the foregoing description and accompanying drawings that I have accomplished the objects primarily stated and that I have provided a novel multiple spindle automatic machine which is simple in operation and which will automatically and continuously operate upon a number of stock bars. It is to be understood that the specific form of the various improved operative elements in the construction and operation of the machine, as specifically shown and described herein, is not restricted and that the invention contemplates many variations in the construction of such improved elements as may be made within the scope of the invention as defined by the appended claims.

Having thus described my invention, I claim:

1. In a machine of the character described, the combination of a rotatable spindle, a stock feeding tube operable within said spindle, a sliding means engaging said tube to positively move it in one direction, and resiliently mounted sliding means adapted to move said tube in the opposite direction, said resilient sliding means engaging behind said first named sliding means whereby the two sliding means are caused to move in unison in the direction of positive movement.

2. In a machine of the character described, the combination of a rotatable spindle, a stock feeding tube operable within said spindle, means for retracting said tube longitudinally of said spindle, and resilient means for advancing said tube, said first named means being adapted to engage said resilient means to retract it.

3. In a machine of the character described, the combination of a rotatable spindle, a stock feeding tube operable within said spindle, a sliding member engaging said tube to move it longitudinally in one direction, means for intermittently actuating said sliding member, a second sliding member adapted to move said tube in the opposite direction, means for actuating said second sliding member, and a spring interposed between said last named means and said second sliding member.

4. In a machine of the character described, the combination of a revoluble spindle turret, a plurality of circularly arranged rotatable spindles, stock feeding tubes operable within said spindles, an intermittently actuated sliding member mounted longitudinally of said tubes, a segmental shoe carried on said member adapted to retract one of said feeding tubes, means for revolving said turret whereby the feeding tubes are sequentially engaged with said shoe, and a second sliding member engaging said tubes subsequent to the retracting operation, said second sliding member being adapted to advance said tubes in the spindles.

5. In a machine of the character described, the combination of a revoluble spindle turret, a plurality of circularly arranged rotatable spindles, stock feeding tubes operable within said spindles, an intermittently actuated sliding member mounted longitudinally of said tubes, a segmental shoe carried on said member adapted to retract one of said feeding tubes, means for revolving said turret whereby the feeding tubes are sequentially engaged with said shoe, and spring actuated means for controlling the movement of the second sliding member.

6. In a machine of the character described, the combination of a revoluble spindle turret, means for intermittently revolving said turret, a gauge stop cooperating with said spindles to position blanks therein, and means for simultaneously opertaing said gauge stop with said turret whereby its function is performed during the revolving of the turret.

7. In a machine of the character described, the combination of a revoluble spindle turret, a plurality of rotating spindles mounted therein, means for intermittently revolving said turret whereby said spindles are indexed from one position to another at a time, means for feeding stock longitudinally of said spindles, a gauge stop cooperating with said feeding means to position said stock in the spindles, and means for actuating said gauges stop whereby its function is performed during the revolving of the turret.

8. In a machine of the character described, the combination of a revoluble spindle turret, a plurality of rotatable spindles mounted therein, means for intermittently revolving said turret, stock feeding means cooperating with said revolving means to advance the stock longitudinally of said spindles, a gauge stop adapted to limit the advance of said stock, and means for actuating said gauge stop to perform its function during the revolving of said turret.

9. In a machine of the character described, the combination of a revoluble spindle turret, a plurality of stock carrying spindles mounted therein, means for intermittently revolving said turret, means for advancing the stock longitudinally of said spindles, and a gauge stop movable with said turret adapted to function during the revolving of said turret and adjustable means for moving said gauge stop longitudinally whereby the advance of said stock is limited.

10. In a machine of the character described, the combination of a revoluble spindle turret, a plurality of stock carrying spindles mounted therein, means for intermittently revolving said turret whereby the spindles are indexed from one position to another at a time, means for advancing the stock longitudinally of said spindles, a gauge stop located in front of said spindles, means adapted to move said gauge stop longitudinally, and means for oscillating said gauge stop in timed relation with the revolving of said turret.

11. In a machine of the character described, the combination of a revoluble spindle turret, a plurality of rotatable stock carrying spindles mounted therein, means for intermittently revolving said spindle turret, means for feeding stock longitudinally of said spindles, a plurality of reciprocating tools adapted to engage the stock in said spindles, and a gauge stop adapted to operate during each reciprocation of said tools and during the revolving of said spindle turret, said stop being movable in conjunction with said turret.

12. A machine of the character described, in combination with stock gauging means comprising an intermittently reciprocating rod having a stock engaging arm mounted on its outer end, means for reciprocating said rod, and means operating in timed relation with said reciprocating means for oscillating said rod whereby the stock engaging arm is arcuately moved.

13. A machine of the character described, in combination with stock gauging means comprising a reciprocating rod mounted parallel with but spaced from the line of feed of said stock, an arm carried on said rod, means for intermittently reciprocating said rod, and means operating in timed relation with said reciprocating means for oscillating said rod whereby said arm is brought into the path of the stock.

14. In a machine of the character described, the combination of a revoluble spindle turret, a plurality of rotatable stock carrying spindles mounted therein, a reciprocating tool slide carrying a plurality of tools adapted to engage the stock in said spindles, a gauge stop adapted to position said stock in the spindles, said gauge stop operating during the revolving of said turret, and means operated by the reciprocation of said tool slide for actuating said gauge stop.

15. In a machine of the character described, the combination of a revoluble spindle turret, a plurality of rotatable stock carrying spindles mounted therein, a reciprocating tool slide, means for intermittently revolving said spindle turret, means for intermittently reciprocating said tool slide, means for gauging the length of stock in said spindles, and means for oscillating said gauging means whereby the same is adapted to operate during the revolving of said spindle turret.

16. In a machine of the character described, the combination of a revoluble spindle turret, a plurality of rotatable stock carrying spindles, a reciprocating tool slide, means for revolving said spindle turret one step at a time during each reciprocation of the tool slide, means actuated by the reciprocation of said tool slide for gauging the length of stock in said spindles, and means for oscillating said gauging means whereby the same is adapted to operate during the revolving of said spindle turret.

17. In combination with stock carrying and stock feeding means, of a gauging mechanism comprising a rod mounted parallel with and spaced from the line of stock feed, an arm carried by said rod, means for intermittently reciprocating said rod, and means operating in timed relation with said reciprocating means for oscillating the rod whereby said arm is swung into the path of the stock.

18. In combination with a reciprocating tool slide, of stock gauging means, operating mechanism for said gauging actuated by the rearward movement of said slide for advancing said gauging means, and means for oscillating said gauging means.

19. In combination with stock carrying and feeding means, and a cooperating reciprocating forming tool, of stock gauging means comprising a rod mounted in parallelism with said stock carrying means, an arm carried by said rod, means for oscillating said rod to bring said arm in line with said stock, and means actuated by the reciprocation of said forming tool for intermittently reciprocating said rod.

20. A stock gauging mechanism comprising a slidably mounted rod, a stock engaging arm mounted on one end thereof, a pinion slidably keyed to said rod, means for oscillating said pinion, a slidably mounted rack, an adjustable connection between said rack and said rod, and means for reciprocating said rack.

21. In a machine of the character described, the combination of a reciprocating tool slide, a plurality of forming tools mounted therein, means for intermittently reciprocating said slide, means operated by said first named means for accelerating the movement of one of said tools whereby said tool may be advanced and retracted before the complete forward movement of the other tools, and a cut-off tool operable at the same station as the accelerated tool, said cut-off tool being actuated after the retraction of the accelerated tool.

22. In a machine of the character described, the combination of a slidably mounted tool slide, a cam drum adapted to intermittently reciprocate said slide, a forming tool mounted in said slide, a sliding member, an adjustable connection between said tool slide and said sliding member, and means carried by said drum for actuating said sliding member.

23. In a machine of the character described, the combination of a slidably mounted tool slide, a cam drum adapted to intermittently reciprocate said slide, a forming tool slidably mounted in said slide, a longitudinal sliding member, means for adjustably connecting said tool to said sliding member, and a cam carried by said drum acting on said sliding member whereby the forward movement of said tool may be accelerated in advance of the slide.

24. In a machine of the character described, the combination of a slidably mounted tool slide, a cam drum adapted to intermittently reciprocate said slide, a forming tool slidably mounted in said slide, a longitudinal sliding member, means for adjustably connecting said tool to said sliding member, a cam carried by said drum acting on said sliding member whereby the forward movement of said tool may be accelerated in advance of the slide, and means for keeping said sliding member in engagement with said cam.

25. In a machine of the character described, the combination of a slidably mounted tool slide, a cam drum mounted in alignment therewith and adapted to intermittently reciprocate said slide, a tool holder slidably mounted in said slide, a sliding member mounted between said drum and said slide, means for connecting said member with the tool holder, and means carried by said drum for actuating said member and tool holder in advance of the movement of said slide.

26. In a machine of the character described, the combination of a slidably mounted tool slide, means for intermittently reciprocating said slide, a tool holder slidably mounted in said slide, a rotatable cam mounted in line with said slide, and means connecting said tool holder with said cam whereby said holder may be moved independently of said slide.

27. In a machine of the character described, the combination of a slidably mounted tool slide, a tool holder slidably mounted therein, said holder extending longitudinally through said slide, a rotatable cam, a projection on said tool holder adapted to engage said cam whereby longitudinal movement is imparted to said holder, and means for keeping said projection in engagement with said cam.

28. A machine of the character described, comprising a revoluble spindle turret, a plurality of rotatable stock carrying spindles mounted therein, means for intermittently indexing said spindle turret one step at a time, a reciprocating tool slide, a plurality of forming tools mounted in said tool slide, said tools being in coaxial alignment with said spindles, means for advancing the stock in one of said spindles during each reciprocation of the tool slide, means for accelerating the forward movement of one of said forming tools, and means for gauging the length of stock as it is advanced, said gauging means being adapted to operate during the indexing of the spindle turret.

29. The combination with a plurality of rotatable spindles, and a number of reciprocating forming tools, of speed regulating mechanism comprising a set of driven change gears for driving said spindles, a second set of change gears for driving said tools and connections between said sets of change gears whereby the feed speed of said tools is automatically maintained at a predetermined rate in proportion to the rotary speed of said spindles regardless of the changes made in the driven speed of the spindles.

30. The combination with a plurality of rotatable spindles, a plurality of movable forming tools, variable speed driving means for rotating said spindles, other variable speed driving means for operatively moving said tools, and means controlling the operation of said driving means for said tools, said means being responsive to variations in speed of said spindles and being adapted to maintain a predetermined ratio between the rotative speed of said spindles and the speed of movement of said tools.

31. In combination with a plurality of rotatable spindles, and a number of reciprocating forming tools of a driven shaft, a driving shaft connected to said spindles, a set of change gears between said shafts, a second set of change gears connected at one end to said spindle driving shaft and at the other end to means for reciprocating said forming tools, and hand operated levers for automatically effecting changes in the relation of said sets of change gears.

32. In combination with a plurality of rotatable spindles, of a driven shaft, a driving shaft connected to said spindles, a self-contained gear box provided with a set of change gears connecting said shafts, a tabulated dial mounted exteriorly of said box and hand operating levers adapted to effect changes in the relation of said change gears, said levers being mounted adjacent to and cooperating with said dial.

33. A machine of the character described comprising a frame, an indexible spindle turret rotatably supported by said frame, means for intermittently indexing said spindle turret, a plurality of spindles rotatably supported by said spindle turret, a spindle drive shaft rotatably supported by said frame and spaced from said spindle turret, a plurality of spindle sprockets supported on said spindles, a drive sprocket supported on said drive shaft, a sprocket chain connected to a plurality of said spindle sprockets, and a second sprocket chain connected to one of said spindle sprockets and said drive sprocket.

34. A machine of the character described comprising a frame, an indexible spindle turret rotatably supported by said frame, means for intermittently indexing said spindle turret, a plurality of spindles supported by said turret, a spindle drive shaft rotatably supported by said frame and spaced from said spindle turret, a plurality of spindle sprockets mounted on said spindles, a drive sprocket mounted on said drive shaft, a sprocket chain connected to a plurality of said spindle sprockets, and a second sprocket chain connected to a plurality of said spindle sprockets and said drive sprocket.

35. A machine of the character described comprising a frame, an indexible spindle turret rotatably supported by said frame, means for intermittently indexing said spindle turret, a plurality of spindles rotatably supported by said turret, and adapted to have work fed through the center thereof, means for periodically feeding work through the center of said spindles in predetermined timed relation to the indexing of said spindle turret, a spindle drive shaft rotatably supported by said frame and spaced from said spindle turret, a plurality of spindle sprockets mounted on said spindles, a drive sprocket mounted on said drive shaft, a sprocket chain connected to a plurality of said spindle sprockets, and a second sprocket chain connected to a plurality of said spindle sprockets and said drive sprocket.

36. In a machine of the character described, the combination of a frame, an indexible spindle turret rotatably supported by said frame, a plurality of spindles supported by said spindle turret and adapted to have work fed through the center thereof, means for intermittently indexing said turret, and resilient means for feeding work through one of said spindles during the indexing of said turret.

37. In a machine of the character described, the combination of a frame, an indexible spindle turret rotatably supported by said frame, a plurality of spindles rotatably supported by said turret and adapted to have work fed through the center thereof, means for intermittently indexing said turret, means slidably supported on said frame for feeding work through one of said spindles during the indexing of said spindle turret, and means for gauging said work during the indexing of said spindle turret.

38. In a machine of the character described, the combination of a frame, an indexible spindle turret rotatably supported by said frame, a plurality of spindles rotatably supported by said spindle turret and adapted to have work fed through the center thereof, means for intermittently indexing said turret, resilient means slidably supported on said frame for feeding work through one of said spindles during the indexing of said turret, and a work gauge operable during the indexing of said turret.

39. In a machine of the character described, the combination of a frame, an indexible spindle turret rotatably supported by said frame, a plurality of spindles rotatably supported by said spindle turret and adapted to have work fed through the center thereof, means for intermittently indexing said turret, feed tubes slidably supported in said spindles, means slidably supported by said frame adapted to engage said feed tubes and move the same to feed work through said spindles, means for moving said member during the indexing of said turret, and means for gauging the work during the feeding operation.

40. In a machine of the character described, the combination of a frame, an indexible spindle turret rotatably supported by said frame, a plurality of spindles rotatably supported by said spindle turret and adapted to have work fed through the center thereof, means for intermittently indexing said turret, feed tubes slidably supported in said spindles, a member slidably supported by said frame provided with a curved portion adapted to engage said feed tubes and move the same to feed work through said spindles, means for moving said member during the indexing of said turret, and means for gauging the amount of work fed.

41. In a machine of the character described, the combination of a frame, an indexible spindle turret rotatably supported by said frame, a plurality of spindles rotatably supported by said turret and adapted to have work fed through the center thereof, means for intermittently indexing said spindle turret, means for feeding work through one of said spindles during the indexing of said turret, a gauge stop cooperating with said spindles to position the work therein, and means for simultaneously operating said gauge stop with said turret whereby its function is performed during the indexing of said turret.

42. In a machine of the character described, the combination of a frame, an indexible spindle turret rotatably supported by said frame, a plurality of spindles rotatably supported by said turret and adapted to have work fed through the center thereof, means for intermittently indexing said spindle turret, means for feeding work through one of said spindles during the indexing of said turret, a gauge stop cooperating with said spindles to position the work therein, and means for reciprocating and oscillating said gauge stop whereby its function is performed during the indexing of said turret.

43. In a machine of the character described, the combination of a frame, an indexible spindle turret rotatably supported by said frame, a spindle rotatably supported by said turret and adapted to have work fed through the center thereof, means for intermittently indexing said spindle turret whereby said spindle is indexed through a plurality of stations, a cutting off tool located at one of said stations, and means for feeding the work through said spindle before said spindle reaches the station next following the last mentioned station, said last mentioned means comprising a member slidably supported on said frame.

44. In a machine of the character described, the combination of a frame, an indexible spindle turret rotatably supported by said frame, a spindle rotatably supported by said spindle turret and adapted to have work fed through the center thereof, a tool slide supported by said frame, means for reciprocating said tool slide toward and from said spindle turret, means for indexing said spindle through a plurality of stations whereby an article is formed on the end of said work, means positioned at one of said stations for cutting off the formed article, and means for feeding the work through said spindle before said spindle reaches the station next following the last mentioned station, said last mentioned means comprising a member slidably supported on said frame.

45. In a machine of the character described, the combination of a frame, an indexible spindle turret rotatably supported by said frame, a plurality of spindles rotatably supported by said spindle turret and adapted to have work fed through the center thereof, a tool slide supported by said frame and provided with a plurality of tools to form a plurality of stations, means for reciprocating said tool slide toward and from said spindle turret, means for indexing said spindle turret whereby said spindles are carried through a plurality of stations and in predetermined timed relation to the reciprocation of said tool slide, a cutting off tool located at one of said stations, and means for feeding work through the spindles in the interim during the cutting off operation and the indexing of the spindle to the next following station, said last mentioned means comprising a member slidably supported on said frame.

46. In a machine of the character described, the combination of a frame, an indexible spindle turret rotatably supported by said frame, a plurality of spindles rotatably supported by said spindle turret and adapted to have work fed through the center thereof, feeding means for feeding work through said spindles, a gauge stop, and means for moving said gauge stop independent of the movement of any of the tools to return part of the work fed by said feeding means.

47. In a machine of the character described, the combination of a frame, an indexible spindle turret rotatably supported by said frame, a plurality of spindles rotatably supported by said spindle turret and adapted to have work fed through the center thereof, feeding means for feeding work through said spindles during the indexing of said turret, a gauge stop, and means for moving said gauge stop to return part of the work fed by said feeding means.

48. In a machine of the character described, the combination of a frame, a plurality of spindles rotatably supported by said frame, a tool slide slidably supported by said frame, means for reciprocating said tool slide toward and from said spindles, an accelerated tool slide slidably supported by said frame, means for moving said accelerated tool slide toward said spindles, and resilient means for moving said accelerated tool slide from said spindles.

49. In a machine of the character described, the combination of a frame, a plurality of spindles rotatably supported by said frame, means for reciprocating said tool slide toward and from said spindles, an accelerated tool slide slidably supported by said frame, cam means for moving said accelerated tool slide toward said spindles, and resilient means for moving said accelerated tool slide from said spindles.

50. In a machine of the character described, the combination of a frame, a plurality of spindles rotatably supported by said frame, a tool slide slidably supported by said frame and adapted to move in a direction parallel with the axis of said spindles, means for reciprocating said tool slide toward and from said spindles, an accelerated tool slide slidably supported by said frame and adapted to reciprocate in a path parallel to the axis of said spindles, means for moving said accelerated tool slide toward said spindles, and resilient means for moving said accelerated tool slide from said spindles.

51. In a machine of the character described, the combination of a frame, a plurality of spindles rotatably supported by said frame, a main tool slide slidably supported by said frame and adapted to be reciprocated in a path parallel with the axis of said spindles, an accelerated tool slide slidably supported by said main tool slide and adapted to be reciprocated in a path parallel with the axis of said spindles and relative to said main tool slide, means for moving said accelerated tool slide toward said spindles, and resilient means for moving said accelerated tool slide from said spindles.

52. In a machine of the character described, the combination of a frame, a plurality of spindles rotatably supported by said frame, a main tool slide slidably supported by said frame and adapted to be reciprocated in a path parallel with the axis of said spindles, an accelerated tool slide slidably supported by said main tool slide and adapted to be reciprocated in a path parallel with the axis of said spindles and relative to said main tool slide, cam means for moving said accelerated tool slide toward said spindle, and resilient means for moving said accelerated tool slide from said spindles.

JOHN P. BROPHY.